United States Patent
Jonietz et al.

(10) Patent No.: US 11,335,187 B2
(45) Date of Patent: May 17, 2022

(54) DYNAMIC PRIVACY-SENSITIVE OPERATING MODES

(71) Applicant: HERE Global B.V., Eindhoven (NL)

(72) Inventors: David Jonietz, Zurich (CH); Tero Keski-Valkama, Geroldswil (CH); Elena Mumford, Eindhoven (NL); Zack Zhu, Baar (CH)

(73) Assignee: HERE Global B.V., Eindhoven (NL)

( * ) Notice: Subject to any disclaimer, the term of this patent is extended or adjusted under 35 U.S.C. 154(b) by 406 days.

(21) Appl. No.: 16/446,741

(22) Filed: Jun. 20, 2019

(65) Prior Publication Data
US 2020/0402393 A1    Dec. 24, 2020

(51) Int. Cl.
G08G 1/01    (2006.01)
G06F 16/29   (2019.01)

(52) U.S. Cl.
CPC .......... *G08G 1/0125* (2013.01); *G06F 16/29* (2019.01); *G08G 1/0112* (2013.01)

(58) Field of Classification Search
CPC .. G08G 1/0125; G08G 1/0112; G08G 1/0133; G08G 1/0141; G06F 16/29
See application file for complete search history.

(56) References Cited

U.S. PATENT DOCUMENTS

| 8,489,110 B2 | 7/2013 | Frank et al. | |
| 2005/0088709 A1* | 4/2005 | Kizaki | H04N 1/32539 358/501 |
| 2016/0300252 A1* | 10/2016 | Frank | G06F 16/24578 |

FOREIGN PATENT DOCUMENTS

| CN | 102595319 A | 7/2012 |
| CN | 107204988 A | 9/2017 |
| EP | 3477342 A1 | 5/2019 |

OTHER PUBLICATIONS

Chow et al., *A Peer-To-Peer Spatial Cloaking Algorithm For Anonymous Location-Based Services*, GIS '06 Proceedings of the 14th Annual ACM International Symposium on Advances in Geographic Information Systems, Nov. 2006, Arlington, Virgina, (8 pages). DOI: 10.1145/1183471.1183500.

(Continued)

*Primary Examiner* — James J Lee
*Assistant Examiner* — Shon G Foley
(74) *Attorney, Agent, or Firm* — Alston & Bird LLP

(57) ABSTRACT

It is determined whether the number of second probe apparatuses in the vicinity of a first probe apparatus satisfies a volume threshold requirement. Responsive to determining that the volume threshold requirement is satisfied, an instance of individual probe data is generated and provided. Responsive to determining that the volume threshold requirement is not satisfied, it is determined if a first instance of collaborative probe data corresponds to a portion of a trajectory of the first probe apparatus. Responsive to determining that the first instance of collaborative probe data corresponds to the portion of the trajectory, a contribution is added to the first instance of collaborative probe data and the updated first instance of collaborative probe data is provided. Otherwise, a first instance of collaborative probe data is generated that comprises a partial representation of probe data corresponding to the portion of the trajectory of the first probe apparatus.

20 Claims, 6 Drawing Sheets

(56) References Cited

OTHER PUBLICATIONS

Cheng et al., *A User Proprietary Obfuscate System For Positions Sharing in Location-Aware Social Networks*, Journal of Computer and Communications, Feb. 2015, pp. 7-20, [retrieved from the Internet Jun. 20, 2019] <URL: https://file.scirp.org/pdf/JCC_2015052509403856.pdf>.

Gupta et al., *Achieving Location Privacy Through CAST in Location Based Services*, Journal of Communications and Networks, vol. 19, No. 3, Jun. 2017, pp. 239-249, [retrieved from the Internet Jun. 19, 2019] <URL: https://isea-pmu.in/paper/viewHardCopy/IjVhOWU4MjE2NTE3NjUucGRmIg:1ftV5f:ytSh5CV3voT48WO_g3U1q5g-gw/?>.

Yang et al., *Full Location Privacy Protection Through Restricted Space Cloaking*, Journal of Information Processing, vol. 25, Aug. 2017, pp. 756-765, [retrieved from the Internet Jun. 20, 2019] <URL: https://www.jstage.jst.go.jp/article/ipsjjip/25/0/25_756/_pdf>.

Beresford et al., *Mix Zones: User Privacy in Location-Aware Services*, (2004), (5 pages), [online], [retrieved from the Internet Jun. 20, 2019] <URL: https://www.cl.cam.ac.uk/~fms27/papers/2004-BeresfordSta-mix.pdf>.

Hu et al., *Non-Exposure Location Anonymity*, 2009 IEEE 25th International Conference on Data Engineering, Shanghai, China, (2009), pp. 1120-1131. DOI: 10.1109/ICDE.2009.106.

Gong et al., *Personalized Location Privacy in Mobile Networks: A Social Group Utility Approach*, 2015 IEEE Conference on Computer Communications (INFOCOM), Kowloon, Hong Kong, (2015), 47 pages. DOI: 10.1109/INFOCOM.2015.7218473.

Mokbel et al., *The New Casper: Query Processing For Location Services Without Compromising Privacy*, VLDB '06 Proceedings of the $32^{nd}$ International Conference On Very Large Databases, Sep. 2006, Seoul, Korea, pp. 763-774.

Huang et al., *CoPrivacy: A Collaborative Location Privacy-Preserving Method without Cloaking Region*, Chinese Journal of Computers, vol. 34, No. 10, Oct. 2011, pp. 1976-1985. DOI: 10.3724/SP.J.1016.2011.01976.

Extended European Search Report (EESR) for European Application No. 20181180.9 dated Nov. 26, 2020 (13 pages).

\* cited by examiner

DYNAMIC PRIVACY-SENSITIVE OPERATING MODES

TECHNOLOGICAL FIELD

An example embodiment relates generally to providing and/or collecting probe information/data to generate and/or determine traffic and/or map information/data. An example embodiment relates generally to the determination of a probe mode in which a mobile apparatus operates.

BACKGROUND

Traffic and/or map information/data corresponding to a road network are often determined based on the processing of probe information/data captured by probe vehicles as they traverse portions of a road network. In geographical areas having a large volume of probe apparatuses, the resulting traffic and/or map information/data reflects probe information/data from a large number of probe apparatuses. Thus, analysis of the traffic and/or map information/data does not provide information/data regarding any particular user corresponding to one of the probe apparatuses. In geographical areas having few probe apparatuses, user's privacy may be compromised as any resulting traffic and/or map information/data is generated based on probe information/data provided by a small volume of probe apparatuses.

BRIEF SUMMARY OF SOME EXAMPLE EMBODIMENTS

Various embodiments provide a technical solution to the technical problem of determining and/or generating traffic and/or map information/data for geographical areas having lower volumes of traffic while maintaining the privacy of users corresponding to probe information/data used to determine and/or generate the traffic and/or map information/data. In various embodiments, a probe apparatus may operate in an obfuscation mode or in a sensing mode. When a probe apparatus traveling through a geographical zone determines that the volume of traffic within the geographical zone is sufficiently high (e.g., based on zone information/data received from an analysis apparatus), the probe apparatus operates in the sensing mode. When operating in the sensing mode, the probe apparatus may generate and provide instances of individual probe information/data. In various embodiments, an instance of individual probe information/data may include a position of the probe apparatus (e.g., a geolocation of the apparatus such as latitude and longitude), a heading of the probe apparatus, a portion of a trajectory of a probe apparatus (e.g., a time-ordered sequence of positions of the probe apparatus), a velocity of the probe apparatus, a vehicle braking information/data, and/or any other elements of information/data corresponding to sensor information/data captured by one or more sensors in communication with the probe apparatus. When a probe apparatus traveling through a geographical zone determines that the volume of traffic within the geographical zone is not sufficiently high (e.g., based on zone information/data received from an analysis apparatus), the probe apparatus operates in the obfuscation mode. When operating in the obfuscation mode, the probe apparatus may contribute to one or more instances of collaborative probe information/data. In an example embodiment, an instance of collaborative probe information/data is generated through a collaborative process where multiple probe apparatuses contribute information/data to the instance of collaborative probe information/data.

Various embodiments provide methods, apparatus, systems, computer program products and/or the like configured for generating and/or determining traffic and/or map information/data based on probe information/data. For example, an analysis apparatus receives a plurality of instances of probe information/data from a plurality of probe apparatuses. The analysis apparatus may analyze the instances of probe information/data to determine the traffic and/or map information/data and provide the traffic and/or map information/data to one or more probe apparatuses and/or other consumer apparatuses. In various embodiments, the instances of probe information/data include one or more instances of collaborative probe information/data and/or one or more instances of individual probe information/data. In an example embodiment, an instance of probe information/data comprises information/data describing a portion of a road network. For example, in an example embodiment, an instance of probe information/data includes a starting point (e.g., defined by a starting latitude and a starting longitude), an ending point (e.g., defined by an ending latitude and ending longitude), and a velocity for a small portion of a road network (e.g., corresponding to a portion of a traversable map element (TME) (e.g., road segment and/or travel lane of a road segment) traversed by the contributing probe apparatuses and/or corresponding vehicles. In an example embodiment, a probe apparatus contributing to an instance of collaborative probe information/data is operating in an obfuscation mode.

In various embodiments, the analysis apparatus may receive a partial and/or incomplete instance of collaborative probe information/data from a contributing probe apparatus and provide the partial and/or incomplete instance of collaborative probe information/data to one or more other probe apparatuses such that other probe apparatuses may contribute to the partial and/or incomplete instance of collaborative probe information/data such that the partial and/or incomplete instance of collaborative probe information/data may become a completed instance of collaborative probe information/data. In various embodiments, a completed instance of collaborative probe information/data may be analyzed by the analysis apparatus to generate and/or determine traffic and/or map information/data. In various embodiments, the analysis apparatus may provide the completed instance of collaborative probe information/data to one or more other probe apparatuses such that other probe apparatuses may attest to and/or confirm the completed instance of collaborative probe information/data. In various embodiments, the attestations and/or confirmations of completed instances of collaborative probe information/data may be used to determine traffic volume information/data for the corresponding portion of the road network (e.g., portion of a TME).

In various embodiments, a first probe apparatus may be traversing a portion of a road network represented by a digital map. The first probe apparatus may determine a volume of traffic and/or number of second probe apparatuses in the vicinity of the first probe apparatus. In an example embodiment, the number of second probe apparatuses in the vicinity of the first probe apparatus may correspond to the number of probe apparatuses within a defined zone or neighborhood (e.g., defined by the analysis apparatus) and/or located within a physical radius d and a temporal radius $\Delta t$ of the first probe apparatus (e.g., is currently located within a circle defined by the physical radius d and centered about the first probe apparatus or was located within the circle defined by the physical radius d and centered about the first probe apparatus within a time window defined by the temporal radius $\Delta t$). Based on the volume of traffic and/or number of second probes in the vicinity of the first probe apparatus, the first probe apparatus may determine whether to operate in an obfuscated mode or in a sensing mode. When operating in a sensing mode, the first probe apparatus may provide one or more instances of individual probe information/data that are complete and/or include more information/data than when the first probe apparatus operates in the obfuscation mode. When operating in an obfuscation mode, the first probe apparatus may contribute to one or more instances of collaborative probe information/data.

In an example embodiment, zone information is received by a probe apparatus. The zone information (a) corresponds to a zone that the probe apparatus is located within and (b) comprises one or more instances of collaborative probe data corresponding to the zone. Responsive to identifying a first instance of collaborative probe data of the one or more instances of collaborative probe data that corresponds to a position of the probe apparatus or a portion of a trajectory of the probe apparatus, the probe apparatus contributes to the first instance of collaborative probe data. Responsive to not identifying an instance of collaborative probe data of the one or more instances of collaborative probe data that corresponds to the position of the probe apparatus or a portion of the trajectory of the probe apparatus, the probe apparatus generates a first instance of collaborative probe data that (a) corresponds to the position of the probe apparatus or the portion of the trajectory of the probe apparatus and (b) comprises an incomplete representation of probe data corresponding to the position of the probe apparatus or the portion of the trajectory of the probe apparatus. The probe apparatus provides the first instance of collaborative probe data such that an analysis apparatus receives the first instance of collaborative probe data.

According to a first aspect, a method for contributing to a first instance of collaborative probe data is provided. In an example embodiment, the method comprises receiving zone information, by a probe apparatus. The zone information (a) corresponds to a zone that the probe apparatus is located within and (b) comprises one or more instances of collaborative probe data corresponding to the zone. The probe apparatus comprises a processor, memory, and a location sensor. The method further comprises, responsive to identifying a first instance of collaborative probe data of the one or more instances of collaborative probe data that corresponds to the position of the probe apparatus or a portion of a trajectory of the probe apparatus, contributing to the first instance of collaborative probe data; and responsive to not identifying an instance of collaborative probe data of the one or more instances of collaborative probe data that corresponds to the position of the probe apparatus or the portion of the trajectory of the probe apparatus, generating a first instance of collaborative probe data. The first instance of probe data (a) corresponds to the position of the probe apparatus or the portion of the trajectory of the probe apparatus and (b) comprises an incomplete representation of probe data corresponding to the position of the probe apparatus or the portion of the trajectory of the probe apparatus. The method further comprises providing the first instance of collaborative probe data such that an analysis apparatus receives the first instance of collaborative probe data.

In an example embodiment, the probe data comprises a starting point of the portion of the trajectory, an ending point of the portion of the trajectory, and a representative velocity corresponding to probe apparatuses traversal of the portion of the trajectory. In an example embodiment, the first instance of collaborative probe data comprises a portion of a bitwise representation of probe data corresponding to the position of the probe apparatus or the portion of the trajectory of the probe apparatus. In an example embodiment, contributing to the first instance of collaborative probe data comprises adding one or more bits of the bitwise representation of probe data to the first instance of collaborative probe data. In an example embodiment, the one or more bits are next least significant bits of the bitwise representation. In an example embodiment, generating the first instance of collaborative probe data comprises generating an instance of collaborative probe data consisting of one or more least significant bits of the bitwise representation. In an example embodiment, contributing to the first instance of collaborative probe data comprises determining that the first instance of collaborative probe data is complete and providing a confirmation of the first instance of collaborative probe data. In an example embodiment, the zone information indicates a number of second probe apparatuses in a vicinity of the probe apparatus and the method further comprises determining that the number of second probe apparatuses in the vicinity of the probe apparatus does not satisfy a volume threshold requirement and, responsive to determining that the number of second probe apparatuses in the vicinity of the probe apparatus does not satisfy a volume threshold requirement, operating in an obfuscation mode, wherein operating in an obfuscation mode comprises contributing to at least one instance of collaborative probe data. In an example embodiment, the method further comprises periodically receiving zone information and periodically evaluating whether the volume threshold requirement is satisfied.

According to another aspect of the present invention, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least receive zone information, by a probe apparatus. The zone information (a) corresponds to a zone that the probe apparatus is located within and (b) comprises one or more instances of collaborative probe data corresponding to the zone. The at least one memory and the computer program code are further configured to, with the processor, cause the apparatus to at least, responsive to identifying a first instance of collaborative probe data of the one or more instances of collaborative probe data that corresponds to the position of the probe apparatus or a portion of a trajectory of the probe apparatus, contribute to the first instance of collaborative probe data; and responsive to not identifying an instance of collaborative probe data of the one or more instances of collaborative probe data that corresponds to the position of the probe apparatus or the portion of the trajectory of the probe apparatus, generate a first instance of collaborative probe data. The first instance of probe data (a) corresponds to the position of the probe apparatus or the portion of the trajectory of the probe apparatus and (b) comprises an incomplete representation of probe data corresponding to the position of the probe apparatus or the portion of the trajectory of the probe apparatus. The at least one memory and the computer program code are further configured to, with the processor, cause the apparatus to at least provide the first instance of collaborative probe data such that an analysis apparatus receives the first instance of collaborative probe data.

In an example embodiment, the probe data comprises a starting point of the portion of the trajectory, an ending point of the portion of the trajectory, and a representative velocity corresponding to probe apparatuses traversal of the portion of the trajectory. In an example embodiment, the first instance of collaborative probe data comprises a portion of a bitwise representation of probe data corresponding to the position of the probe apparatus or the portion of the trajectory of the probe apparatus. In an example embodiment, contributing to the first instance of collaborative probe data comprises adding one or more bits of the bitwise representation of probe data to the first instance of collaborative probe data. In an example embodiment, the one or more bits are next least significant bits of the bitwise representation. In an example embodiment, generating the first instance of collaborative probe data comprises generating an instance of collaborative probe data consisting of one or more least significant bits of the bitwise representation. In an example embodiment, contributing to the first instance of collaborative probe data comprises determining that the first instance of collaborative probe data is complete and providing a confirmation of the first instance of collaborative probe data. In an example embodiment, the zone information indicates a number of second probe apparatuses in a vicinity of the probe apparatus and the method further comprises determining that the number of second probe apparatuses in the vicinity of the probe apparatus does not satisfy a volume threshold requirement and, responsive to determining that the number of second probe apparatuses in the vicinity of the probe apparatus does not satisfy a volume threshold requirement, operating in an obfuscation mode, wherein operating in an obfuscation mode comprises contributing to at least one instance of collaborative probe data. In an example embodiment, the at least one memory and the computer program code are further configured to, with the processor, cause the apparatus to at least periodically receive zone information and periodically evaluate whether the volume threshold requirement is satisfied.

In still another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive zone information, by a probe apparatus. The zone information (a) corresponds to a zone that the probe apparatus is located within and (b) comprises one or more instances of collaborative probe data corresponding to the zone. The computer-readable program code portions further comprise executable portions configured, when executed by a processor of an apparatus, to cause the apparatus to, responsive to identifying a first instance of collaborative probe data of the one or more instances of collaborative probe data that corresponds to the position of the probe apparatus or a portion of a trajectory of the probe apparatus, contribute to the first instance of collaborative probe data; and responsive to not identifying an instance of collaborative probe data of the one or more instances of collaborative probe data that corresponds to the position of the probe apparatus or the portion of the trajectory of the probe apparatus, generate a first instance of collaborative probe data. The first instance of probe data (a) corresponds to the position of the probe apparatus or the portion of the trajectory of the probe apparatus and (b) comprises an incomplete representation of probe data corresponding to the position of the probe apparatus or the portion of the trajectory of the probe apparatus. The computer-readable program code portions further comprise executable portions configured, when executed by a processor of an apparatus, to cause the apparatus to provide the first instance of collaborative probe data such that an analysis apparatus receives the first instance of collaborative probe data.

In an example embodiment, the probe data comprises a starting point of the portion of the trajectory, an ending point of the portion of the trajectory, and a representative velocity corresponding to probe apparatuses traversal of the portion of the trajectory. In an example embodiment, the first instance of collaborative probe data comprises a portion of a bitwise representation of probe data corresponding to the position of the probe apparatus or the portion of the trajectory of the probe apparatus. In an example embodiment, contributing to the first instance of collaborative probe data comprises adding one or more bits of the bitwise representation of probe data to the first instance of collaborative probe data. In an example embodiment, the one or more bits are next least significant bits of the bitwise representation. In an example embodiment, generating the first instance of collaborative probe data comprises generating an instance of collaborative probe data consisting of one or more least significant bits of the bitwise representation. In an example embodiment, contributing to the first instance of collaborative probe data comprises determining that the first instance of collaborative probe data is complete and providing a confirmation of the first instance of collaborative probe data. In an example embodiment, the zone information indicates a number of second probe apparatuses in a vicinity of the probe apparatus and the method further comprises determining that the number of second probe apparatuses in the vicinity of the probe apparatus does not satisfy a volume threshold requirement and, responsive to determining that the number of second probe apparatuses in the vicinity of the probe apparatus does not satisfy a volume threshold requirement, operating in an obfuscation mode, wherein operating in an obfuscation mode comprises contributing to at least one instance of collaborative probe data. In an example embodiment, the computer-readable program code portions further comprise executable portions configured, when executed by a processor of an apparatus, to cause the apparatus to periodically receive zone information and periodically evaluate whether the volume threshold requirement is satisfied.

According to yet another aspect, an apparatus is provided. In an example embodiment, the apparatus comprises means for receiving zone information. The zone information (a) corresponds to a zone that the probe apparatus is located within and (b) comprises one or more instances of collaborative probe data corresponding to the zone. The apparatus comprises means for, responsive to identifying a first instance of collaborative probe data of the one or more instances of collaborative probe data that corresponds to the position of the probe apparatus or a portion of a trajectory of the probe apparatus, contributing to the first instance of collaborative probe data. The apparatus comprises means for, responsive to not identifying an instance of collaborative probe data of the one or more instances of collaborative probe data that corresponds to the position of the probe apparatus or the portion of the trajectory of the probe apparatus, generating a first instance of collaborative probe data. The first instance of probe data (a) corresponds to the position of the probe apparatus or the portion of the trajectory of the probe apparatus and (b) comprises an incomplete representation of probe data corresponding to the position of the probe apparatus or the portion of the trajectory of the probe apparatus. The apparatus comprises means for providing the first instance of collaborative probe data such that an analysis apparatus receives the first instance of collaborative probe data.

In an example embodiment, a first probe apparatus receives volume information indicating a number of second probe apparatuses in the vicinity of the first probe apparatus. The first probe apparatus determines whether the number of second probe apparatuses in the vicinity of the first probe apparatus satisfies a volume threshold requirement. Responsive to determining that the number of second probe apparatuses in the vicinity of the first probe apparatus satisfies the volume threshold requirement, the first probe apparatus generates and provides an instance of individual probe data such that an analysis apparatus receives the instance of individual probe data. Responsive to determining that the number of second probe apparatuses in the vicinity of the first probe apparatus does not satisfy the volume threshold requirement, the first probe apparatus determines if a first instance of collaborative probe data of one or more instances of collaborative probe data corresponds to a position of the first probe apparatus or a portion of a trajectory of the first probe apparatus, wherein the one or more instances of collaborative probe data were provided by the analysis apparatus; responsive to determining that the first instance of collaborative probe data corresponds to the position of the first probe apparatus or a portion of the trajectory of the first probe apparatus, contribute to the first instance of collaborative probe data and providing an updated first instance of collaborative probe data such that the analysis apparatus receives the updated first instance of collaborative probe data comprises the contribution of the apparatus; and responsive to determining that none of the one or more instances of collaborative probe data corresponds to the position of the first probe apparatus or the portion of the trajectory of the first probe apparatus, generate a first instance of collaborative probe data that comprises a partial representation of probe data corresponding to the position of the first apparatus or the portion of the trajectory of the first apparatus.

According to an aspect, a method is provided for selecting an operating mode and operating in the selected operating mode. In an example embodiment, the method comprises receiving, by a first probe apparatus, volume information indicating a number of second probe apparatuses in the vicinity of the first probe apparatus. The first probe apparatus comprises a processor, memory, a communication interface, and a location sensor. In an example embodiment, the method further comprises determining, by the first probe apparatus, whether the number of second probe apparatuses in the vicinity of the first probe apparatus satisfies a volume threshold requirement. The method further comprises, responsive to determining that the number of second probe apparatuses in the vicinity of the first probe apparatus satisfies the volume threshold requirement, generating and providing, by the first probe apparatus, an instance of individual probe data such that an analysis apparatus receives the instance of individual probe data. The method further comprises, responsive to determining that the number of second probe apparatuses in the vicinity of the first probe apparatus does not satisfy the volume threshold requirement, determining, by the first probe apparatus, if a first instance of collaborative probe data of one or more instances of collaborative probe data corresponds to a position of the first probe apparatus or a portion of a trajectory of the first probe apparatus. The one or more instances of collaborative probe data were provided by the analysis apparatus. The method further comprises, responsive to determining that the first instance of collaborative probe data corresponds to the position of the first probe apparatus or a portion of the trajectory of the first probe apparatus, contributing, by the first probe apparatus, to the first instance of collaborative probe data and providing an updated first instance of collaborative probe data such that the analysis apparatus receives the updated first instance of collaborative probe data. The method further comprises, responsive to determining that none of the one or more instances of collaborative probe data corresponds to the position of the first probe apparatus or the portion of the trajectory of the first probe apparatus, generating, by the first probe apparatus, a first instance of collaborative probe data that comprises a partial representation of probe data corresponding to the position of the first probe apparatus or the portion of the trajectory of the first probe apparatus and providing the first instance of collaborative probe data such that the analysis apparatus receives the first instance of collaborative probe data.

In an example embodiment, the instance of individual probe data comprises probe data that is either (a) accurate to sensor data captured by one or more sensors in communication with the apparatus or (b) sensor data captured by the one or more sensors in communication with the apparatus that is modified based on a noise distribution. In an example embodiment, the probe data comprises a starting point of the portion of the trajectory, an ending point of the portion of the trajectory, and one or more travel features corresponding to probe apparatuses traversal of the portion of the trajectory. In an example embodiment, the first instance of collaborative probe data comprises a portion of a bitwise representation of probe data corresponding to the position of the probe apparatus or the portion of the trajectory of the probe apparatus. In an example embodiment, contributing to the first instance of collaborative probe data comprises adding one or more bits of the bitwise representation of probe data to the first instance of collaborative probe data. In an example embodiment, the one or more bits are next least significant bits of the bitwise representation. In an example embodiment, generating the first instance of collaborative probe data comprises generating an instance of collaborative probe data consisting of one or more least significant bits of the bitwise representation. In an example embodiment, contributing to the first instance of collaborative probe data comprises determining that the first instance of collaborative probe data is complete and providing a confirmation of the first instance of collaborative probe data. In an example embodiment, the method further comprises receiving zone information provided by the analysis apparatus, wherein the zone information indicates a number of probe apparatuses in the vicinity of the apparatus. In an example embodiment, the method further comprises periodically receiving zone information and periodically evaluating whether the volume threshold requirement is satisfied.

According to another aspect of the present invention, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least receive volume information indicating a number of second probe apparatuses in the vicinity of the apparatus. In an example embodiment, the at least one memory and the computer program code are further configured to, with the processor, cause the apparatus to at least determine whether the number of second probe apparatuses in the vicinity of the first probe apparatus satisfies a volume threshold requirement. The at least one memory and the computer program code are further configured to, with the processor, cause the apparatus to at least, responsive to determining that the number of second probe apparatuses in the vicinity of the first probe apparatus satisfies the volume threshold requirement, generate and provide an instance of individual probe data such that an analysis apparatus receives the instance of individual probe data. The at least one memory and the computer program code are further configured to, with the processor, cause the apparatus to at least, responsive to determining that the number of second probe apparatuses in the vicinity of the first probe apparatus does not satisfy the volume threshold requirement, determine if a first instance of collaborative probe data of one or more instances of collaborative probe data corresponds to a position of the apparatus or a portion of a trajectory of the apparatus. The one or more instances of collaborative probe data were provided by the analysis apparatus. The at least one memory and the computer program code are further configured to, with the processor, cause the apparatus to at least, responsive to determining that the first instance of collaborative probe data corresponds to the position of the apparatus or a portion of the trajectory of the apparatus, contribute to the first instance of collaborative probe data and provide an updated first instance of collaborative probe data such that the analysis apparatus receives the updated first instance of collaborative probe data. The at least one memory and the computer program code are further configured to, with the processor, cause the apparatus to at least, responsive to determining that none of the one or more instances of collaborative probe data corresponds to the position of the first probe apparatus or the portion of the trajectory of the first probe apparatus, generate a first instance of collaborative probe data that comprises a partial representation of probe data corresponding to the position of the first apparatus or the portion of the trajectory of the first apparatus and provide the first instance of collaborative probe data such that the analysis apparatus receives the first instance of collaborative probe data.

In an example embodiment, the instance of individual probe data comprises probe data that is either (a) accurate to sensor data captured by one or more sensors in communication with the apparatus or (b) sensor data captured by the one or more sensors in communication with the apparatus that is modified based on a noise distribution. In an example embodiment, the probe data comprises a starting point of the portion of the trajectory, an ending point of the portion of the trajectory, and one or more travel features corresponding to probe apparatuses traversal of the portion of the trajectory. In an example embodiment, the first instance of collaborative probe data comprises a portion of a bitwise representation of probe data corresponding to the position of the probe apparatus or the portion of the trajectory of the probe apparatus. In an example embodiment, contributing to the first instance of collaborative probe data comprises adding one or more bits of the bitwise representation of probe data to the first instance of collaborative probe data. In an example embodiment, the one or more bits are next least significant bits of the bitwise representation. In an example embodiment, generating the first instance of collaborative probe data comprises generating an instance of collaborative probe data consisting of one or more least significant bits of the bitwise representation. In an example embodiment, contributing to the first instance of collaborative probe data comprises determining that the first instance of collaborative probe data is complete and providing a confirmation of the first instance of collaborative probe data. In an example embodiment, the at least one memory and the computer program code are further configured to, with the processor, cause the apparatus to at least receive zone information provided by the analysis apparatus, wherein the zone information indicates a number of probe apparatuses in the vicinity of the apparatus. In an example embodiment, the at least one memory and the computer program code are further configured to, with the processor, cause the apparatus to at least periodically receive zone information and periodically evaluate whether the volume threshold requirement is satisfied.

In still another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive volume information indicating a number of second probe apparatuses in the vicinity of the apparatus. In an example embodiment, the computer-readable program code portions further comprise executable portions configured, when executed by a processor of an apparatus, to cause the apparatus to determine whether the number of second probe apparatuses in the vicinity of the first probe apparatus satisfies a volume threshold requirement. The computer-readable program code portions further comprise executable portions configured, when executed by a processor of an apparatus, to cause the apparatus to, responsive to determining that the number of second probe apparatuses in the vicinity of the first probe apparatus satisfies the volume threshold requirement, generate and provide an instance of individual probe data such that an analysis apparatus receives the instance of individual probe data. The computer-readable program code portions further comprise executable portions configured, when executed by a processor of an apparatus, to cause the apparatus to, responsive to determining that the number of second probe apparatuses in the vicinity of the first probe apparatus does not satisfy the volume threshold requirement, determine if a first instance of collaborative probe data of one or more instances of collaborative probe data corresponds to a position of the apparatus or a portion of a trajectory of the apparatus. The one or more instances of collaborative probe data were provided by the analysis apparatus. The computer-readable program code portions further comprise executable portions configured, when executed by a processor of an apparatus, to cause the apparatus to, responsive to determining that the first instance of collaborative probe data corresponds to the position of the apparatus or a portion of the trajectory of the apparatus, contribute to the first instance of collaborative probe data and provide an updated first instance of collaborative probe data such that the analysis apparatus receives the updated first instance of collaborative probe data. The computer-readable program code portions further comprise executable portions configured, when executed by a processor of an apparatus, to cause the apparatus to, responsive to determining that none of the one or more instances of collaborative probe data corresponds to the position of the first probe apparatus or the portion of the trajectory of the first probe apparatus, generate a first instance of collaborative probe data that comprises a partial representation of probe data corresponding to the position of the first apparatus or the portion of the trajectory of the first apparatus and provide the first instance of collaborative probe data such that the analysis apparatus receives the first instance of collaborative probe data.

In an example embodiment, the instance of individual probe data comprises probe data that is either (a) accurate to sensor data captured by one or more sensors in communication with the apparatus or (b) sensor data captured by the one or more sensors in communication with the apparatus that is modified based on a noise distribution. In an example embodiment, the probe data comprises a starting point of the portion of the trajectory, an ending point of the portion of the trajectory, and one or more travel features corresponding to probe apparatuses traversal of the portion of the trajectory. In an example embodiment, the first instance of collaborative probe data comprises a portion of a bitwise representation of probe data corresponding to the position of the probe apparatus or the portion of the trajectory of the probe apparatus. In an example embodiment, contributing to the first instance of collaborative probe data comprises adding one or more bits of the bitwise representation of probe data to the first instance of collaborative probe data. In an example embodiment, the one or more bits are next least significant bits of the bitwise representation. In an example embodiment, generating the first instance of collaborative probe data comprises generating an instance of collaborative probe data consisting of one or more least significant bits of the bitwise representation. In an example embodiment, contributing to the first instance of collaborative probe data comprises determining that the first instance of collaborative probe data is complete and providing a confirmation of the first instance of collaborative probe data. In an example embodiment, the computer-readable program code portions further comprise executable portions configured, when executed by a processor of an apparatus, to cause the apparatus to receive zone information provided by the analysis apparatus, wherein the zone information indicates a number of probe apparatuses in the vicinity of the apparatus. In an example embodiment, the computer-readable program code portions further comprise executable portions configured, when executed by a processor of an apparatus, to cause the apparatus to periodically receive zone information and periodically evaluate whether the volume threshold requirement is satisfied.

According to yet another aspect, an apparatus is provided. In an example embodiment, the apparatus comprises means for receiving volume information indicating a number of second probe apparatuses in the vicinity of the apparatus. In an example embodiment, the apparatus comprises means for determining whether the number of second probe apparatuses in the vicinity of the apparatus satisfies a volume threshold requirement. The apparatus comprises means for, responsive to determining that the number of second probe apparatuses in the vicinity of the apparatus satisfies the volume threshold requirement, generating and providing an instance of individual probe data such that an analysis apparatus receives the instance of individual probe data. The apparatus comprises means for, responsive to determining that the number of second probe apparatuses in the vicinity of the apparatus does not satisfy the volume threshold requirement, determining if a first instance of collaborative probe data of one or more instances of collaborative probe data corresponds to a position of the apparatus or a portion of a trajectory of the apparatus. The one or more instances of collaborative probe data were provided by the analysis apparatus. The apparatus comprises means for, responsive to determining that the first instance of collaborative probe data corresponds to the position of the first probe apparatus or a portion of the trajectory of the first probe apparatus, contributing to the first instance of collaborative probe data and providing an updated first instance of collaborative probe data such that the analysis apparatus receives the updated first instance of collaborative probe data. The apparatus comprises means for, responsive to determining that none of the one or more instances of collaborative probe data corresponds to the position of the apparatus or the portion of the trajectory of the apparatus, generating a first instance of collaborative probe data that comprises a partial representation of probe data corresponding to the position of the apparatus or the portion of the trajectory of the apparatus and providing the first instance of collaborative probe data such that the analysis apparatus receives the first instance of collaborative probe data.

In an example embodiment, an analysis apparatus generates and/or determines traffic information/data based at least in part on instances of collaborative probe information/data. In an example embodiment, an analysis apparatus receives an instance of collaborative probe data. The instance of collaborative probe data comprises a partial representation of probe data corresponding to travel of one or more first probe apparatuses along a portion of a road network. The analysis apparatus provides the instance of collaborative probe data such that a second probe apparatus receives the instance of collaborative probe data. The analysis apparatus receives an updated version of the instance of collaborative probe data comprising a contribution from the second probe apparatus. The updated version of the instance of collaborative probe data comprises a more complete representation of the probe data then the provided instance of collaborative probe data. Responsive to determining that the updated version of the instance of collaborative probe data satisfies a completeness threshold requirement, the analysis apparatus uses the updated version of the instance of collaborative probe data to determine traffic and/or map data corresponding to the portion of the road network.

According to an aspect of the present invention, a method for generating and/or determining traffic and/or map information/data using instances of collaborative probe information/data is provided. In an example embodiment, the method comprises receiving, by an analysis apparatus, an instance of collaborative probe data. The instance of collaborative probe data comprises a partial representation of probe data corresponding to travel of one or more first probe apparatuses along a portion of a road network. The method further comprises providing, by the analysis apparatus, the instance of collaborative probe data such that a second probe apparatus receives the instance of collaborative probe data. The method further comprises receiving, by the analysis apparatus, an updated version of the instance of collaborative probe data comprising a contribution from the second probe apparatus. The updated version of the instance of collaborative probe data comprises a more complete representation of the probe data then the provided instance of collaborative probe data. The method further comprises, responsive to determining that the updated version of the instance of collaborative probe data satisfies a completeness threshold requirement, using, by the analysis apparatus, the updated version of the instance of collaborative probe data to determine traffic and/or map data corresponding to the portion of the road network.

In an example embodiment, the method further comprises providing the traffic and/or map data such that a consumer apparatus receives the traffic and/or map data, wherein the consumer apparatus is configured to use at least a portion of the traffic and/or map data to perform a navigation function.

In an example embodiment, the method further comprises determining that most recent updated version of the instance of collaborative probe data was received more than a set time radius ago; and removing the instance of collaborative probe data from a set of instances of collaborative probe data to be provided to probe apparatuses. In an example embodiment, the method further comprises receiving one or more instances of individual probe data corresponding to the portion of the road network. In an example embodiment, the method further comprises using both the one or more instances of individual probe data and the first instance of collaborative probe data to determine the traffic and/or map data. In an example embodiment, an instance of collaborative probe data is an instance of probe data that is completed by contributions provided by two or more probe apparatuses. In an example embodiment, a complete instance of collaborative probe data comprises contributions provided by two or more probe apparatuses.

According to another aspect of the present invention, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least receive an instance of collaborative probe data. The instance of collaborative probe data comprises a partial representation of probe data corresponding to travel of one or more first probe apparatuses along a portion of a road network. The at least one memory and the computer program code are further configured to, with the processor, cause the apparatus to at least provide the instance of collaborative probe data such that a second probe apparatus receives the instance of collaborative probe data. The at least one memory and the computer program code are further configured to, with the processor, cause the apparatus to at least receive an updated version of the instance of collaborative probe data comprising a contribution from the second probe apparatus. The updated version of the instance of collaborative probe data comprises a more complete representation of the probe data then the provided instance of collaborative probe data. The at least one memory and the computer program code are further configured to, with the processor, cause the apparatus to at least, responsive to determining that the updated version of the instance of collaborative probe data satisfies a completeness threshold requirement, use the updated version of the instance of collaborative probe data to determine traffic and/or map data corresponding to the portion of the road network.

In an example embodiment, the at least one memory and the computer program code are further configured to, with the processor, cause the apparatus to at least provide the traffic and/or map data such that a consumer apparatus receives the traffic and/or map data, wherein the consumer apparatus is configured to use at least a portion of the traffic and/or map data to perform a navigation function. In an example embodiment, the at least one memory and the computer program code are further configured to, with the processor, cause the apparatus to at least determine that most recent updated version of the instance of collaborative probe data was received more than a set time radius ago; and remove the instance of collaborative probe data from a set of instances of collaborative probe data to be provided to probe apparatuses. In an example embodiment, the at least one memory and the computer program code are further configured to, with the processor, cause the apparatus to at least receive one or more instances of individual probe data corresponding to the portion of the road network. In an example embodiment, the at least one memory and the computer program code are further configured to, with the processor, cause the apparatus to at least use both the one or more instances of individual probe data and the first instance of collaborative probe data to determine the traffic and/or map data. In an example embodiment, an instance of collaborative probe data is an instance of probe data that is completed by contributions provided by two or more probe apparatuses. In an example embodiment, a complete instance of collaborative probe data comprises contributions provided by two or more probe apparatuses.

In still another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive an instance of collaborative probe data. The instance of collaborative probe data comprises a partial representation of probe data corresponding to travel of one or more first probe apparatuses along a portion of a road network. The computer-readable program code portions further comprise executable portions configured, when executed by a processor of an apparatus, to cause the apparatus to provide the instance of collaborative probe data such that a second probe apparatus receives the instance of collaborative probe data. The computer-readable program code portions further comprise executable portions configured, when executed by a processor of an apparatus, to cause the apparatus to receive an updated version of the instance of collaborative probe data comprising a contribution from the second probe apparatus. The updated version of the instance of collaborative probe data comprises a more complete representation of the probe data then the provided instance of collaborative probe data. The computer-readable program code portions further comprise executable portions configured, when executed by a processor of an apparatus, to cause the apparatus to, responsive to determining that the updated version of the instance of collaborative probe data satisfies a completeness threshold requirement, use the updated version of the instance of collaborative probe data to determine traffic and/or map data corresponding to the portion of the road network.

In an example embodiment, the computer-readable program code portions further comprise executable portions configured, when executed by a processor of an apparatus, to cause the apparatus to provide the traffic and/or map data such that a consumer apparatus receives the traffic and/or map data, wherein the consumer apparatus is configured to use at least a portion of the traffic and/or map data to perform a navigation function. In an example embodiment, the computer-readable program code portions further comprise executable portions configured, when executed by a processor of an apparatus, to cause the apparatus to determine that most recent updated version of the instance of collaborative probe data was received more than a set time radius ago; and remove the instance of collaborative probe data from a set of instances of collaborative probe data to be provided to probe apparatuses. In an example embodiment, the computer-readable program code portions further comprise executable portions configured, when executed by a processor of an apparatus, to cause the apparatus to receive one or more instances of individual probe data corresponding to the portion of the road network. In an example embodiment, the computer-readable program code portions further comprise executable portions configured, when executed by a processor of an apparatus, to cause the apparatus to use both the one or more instances of individual probe data and the first instance of collaborative probe data to determine the traffic and/or map data. In an example embodiment, an instance of collaborative probe data is an instance of probe data that is completed by contributions provided by two or more probe apparatuses. In an example embodiment, a complete instance of collaborative probe data comprises contributions provided by two or more probe apparatuses.

According to yet another aspect, an apparatus is provided. In an example embodiment, the apparatus comprises means for receiving an instance of collaborative probe data. The instance of collaborative probe data comprises a partial representation of probe data corresponding to travel of one or more first probe apparatuses along a portion of a road network. The apparatus comprises means for providing the instance of collaborative probe data such that a second probe apparatus receives the instance of collaborative probe data. The apparatus comprises means for receiving an updated version of the instance of collaborative probe data comprising a contribution from the second probe apparatus. The updated version of the instance of collaborative probe data comprises a more complete representation of the probe data then the provided instance of collaborative probe data. The apparatus comprises means for, responsive to determining that the updated version of the instance of collaborative probe data satisfies a completeness threshold requirement, using the updated version of the instance of collaborative probe data to determine traffic and/or map data corresponding to the portion of the road network.

BRIEF DESCRIPTION OF THE DRAWINGS

Figure 1:
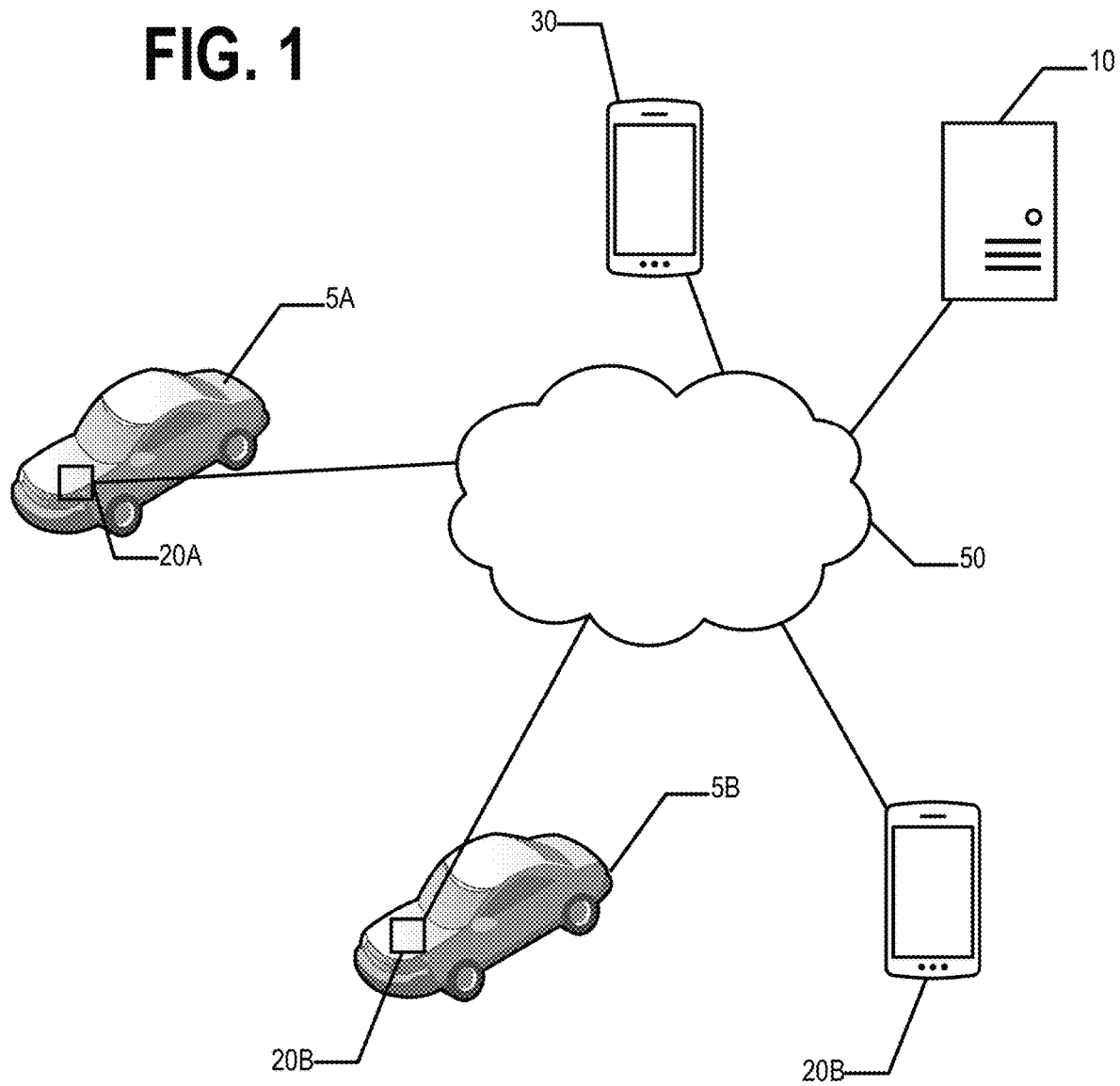
Figure 2A:
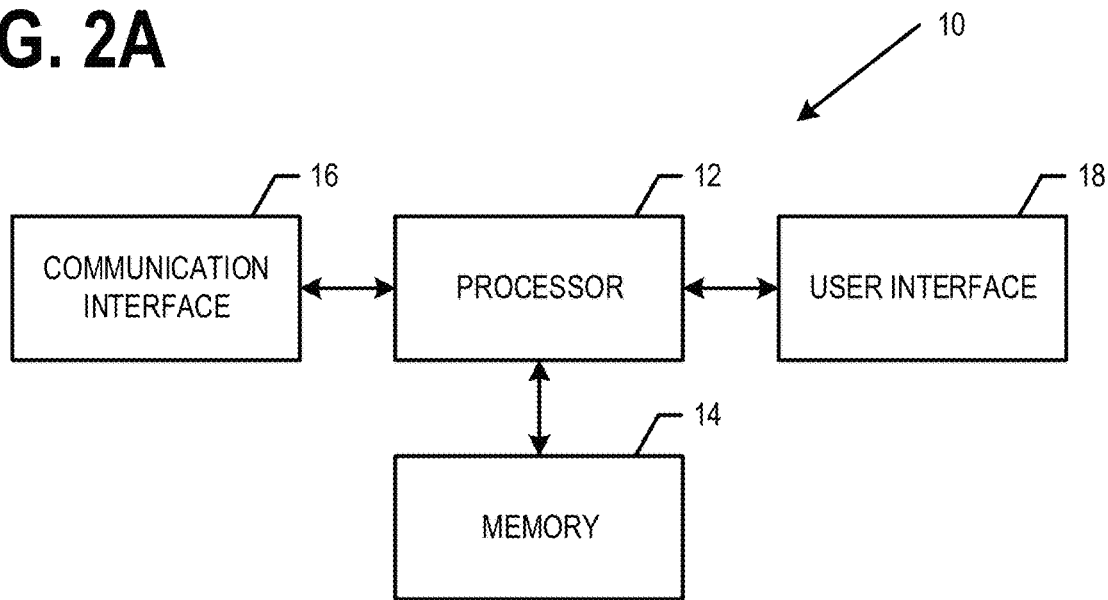
Figure 2B:
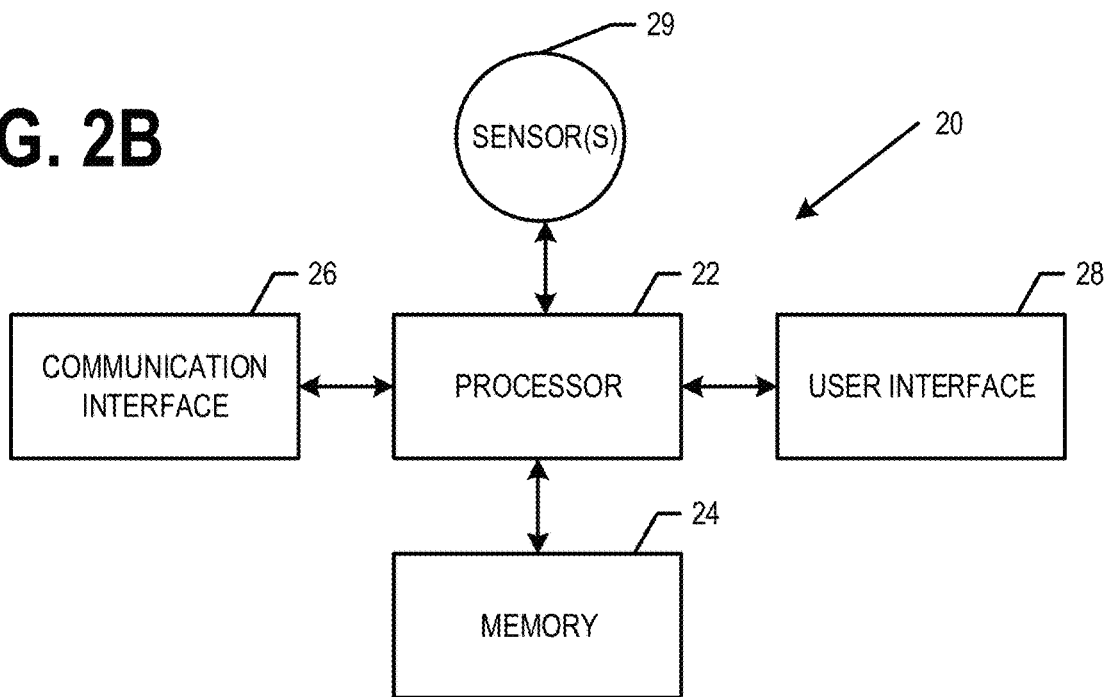
Figure 3:
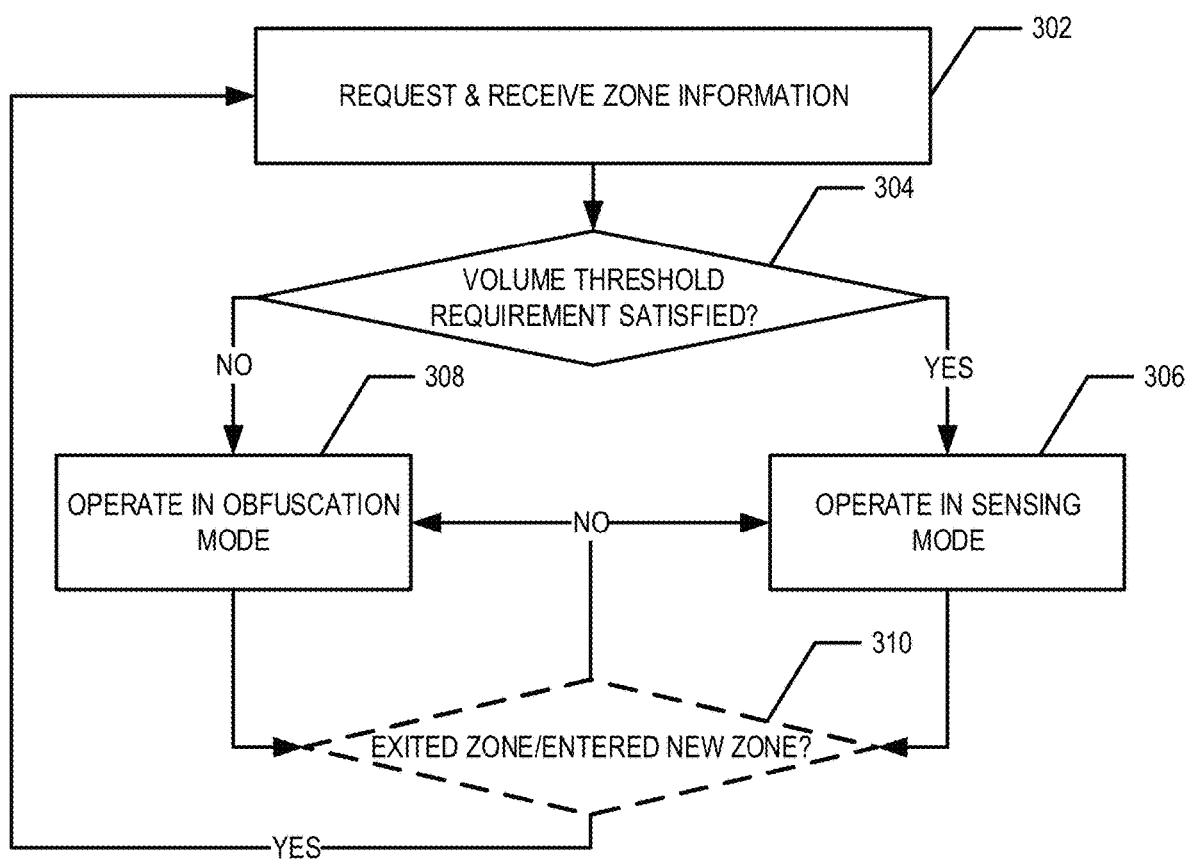
Figure 4:
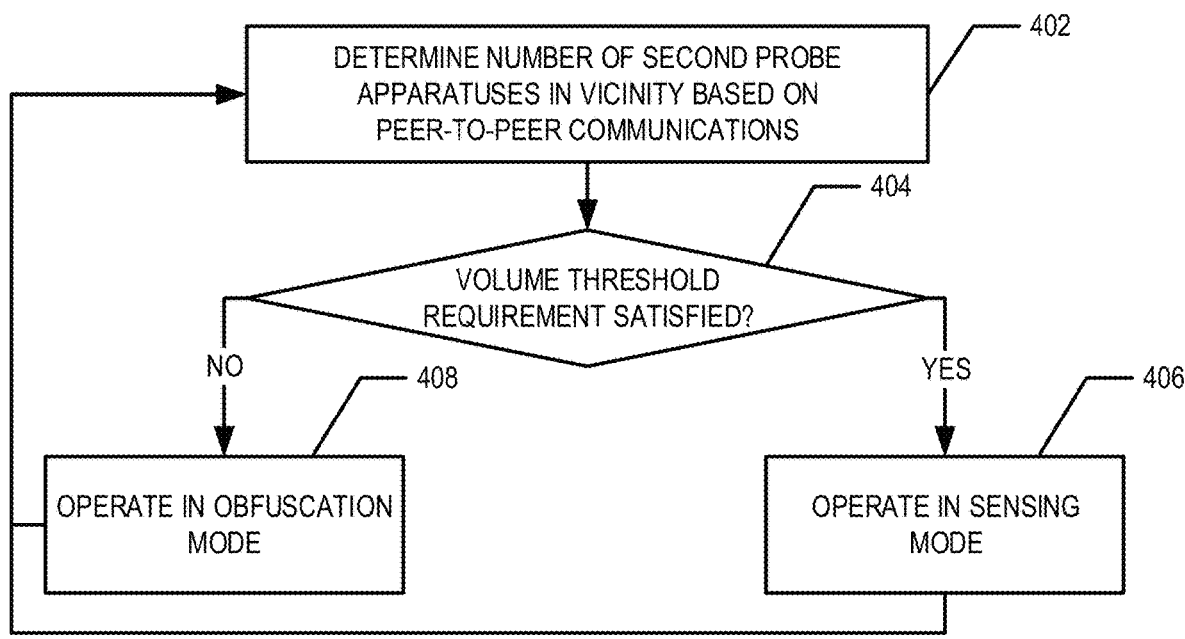
Figure 5:
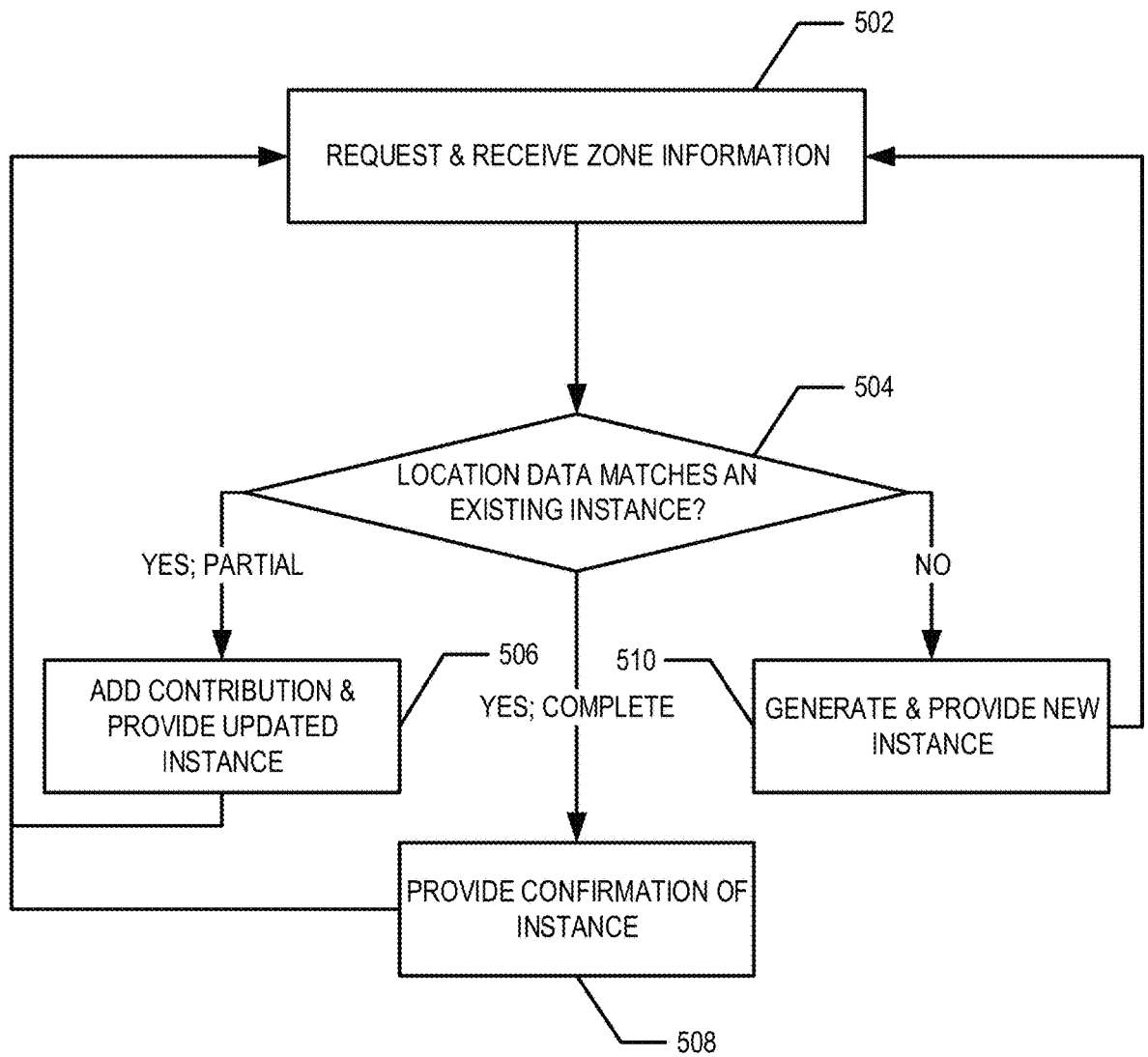
Figure 6:
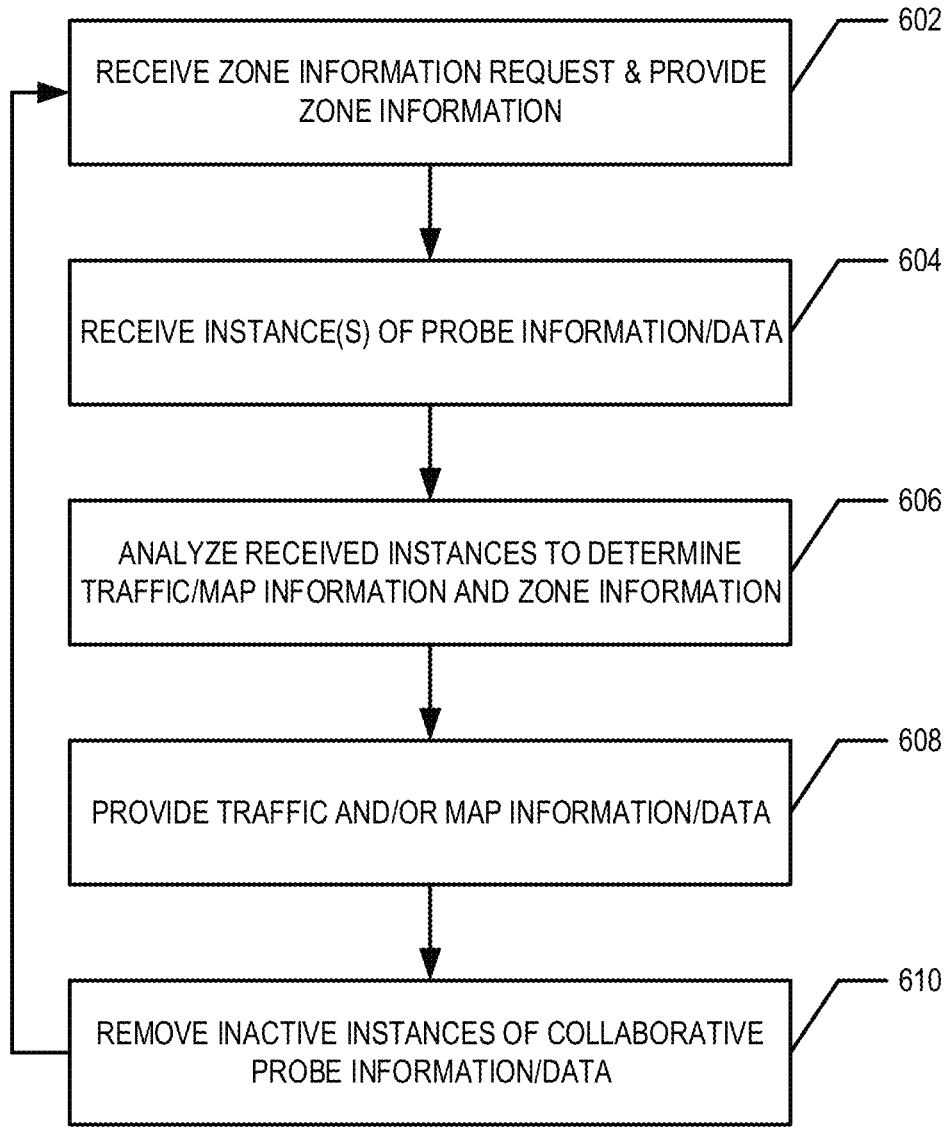

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an analysis apparatus that may be specifically configured in accordance with an example embodiment;

FIG. 2B is a block diagram of a probe apparatus that may be specifically configured in accordance with an example embodiment;

FIG. 3 is a flowchart illustrating operations performed, such as by a first probe apparatus of FIG. 2B to determine an operating mode under which the first probe apparatus generates and provides probe information/data, in accordance with an example embodiment;

FIG. 4 is a flowchart illustrating operations performed, such as by a first probe apparatus of FIG. 2B to determine an operating mode under which the first probe apparatus generates and provides probe information/data, in accordance with another example embodiment;

FIG. 5 is a flowchart illustrating operations performed, such as by a first probe apparatus of FIG. 2B to contribute to instances of collaborative probe information/data when operating in the obfuscation mode, in accordance with an example embodiment;

FIG. 6 is a flowchart illustrating operations performed, such as by an analysis apparatus of FIG. 2A to generate and/or determine and provide traffic and/or map information/data, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided in accordance with an example embodiment in order to generate and/or determine traffic and/or map information/data based on probe information/data provided by probe apparatuses in a manner that reduces the risk of the privacy of a user corresponding to a probe apparatus being compromised. Methods, apparatus, systems, and computer program products are provided in accordance with an example embodiment in order to select a sensing mode and operate a probe apparatus in accordance with the selected sensing mode.

In various embodiments, a first probe apparatus may be traversing a portion of a road network represented by a digital map. The first probe apparatus may determine a volume of traffic and/or number of second probe apparatuses in the vicinity of the first probe apparatus. In an example embodiment, the number of second probe apparatuses in the vicinity of the first probe apparatus may correspond to the number of probe apparatuses within a defined zone or neighborhood (e.g., defined by the analysis apparatus) and/or located within a physical radius d and a temporal radius Δt of the first probe apparatus (e.g., is currently located within a circle defined by the physical radius d and centered about the first probe apparatus or was located within the circle defined by the physical radius d and centered about the first probe apparatus within a time window defined by the temporal radius Δt). Based on the volume of traffic and/or number of second probes in the vicinity of the first probe apparatus, the first probe apparatus may determine whether to operate in an obfuscated mode or in a sensing mode. For example, when the number of second probes in the vicinity of the first probe apparatus satisfies a threshold condition (e.g., is greater than a threshold value), the first probe apparatus is operated in the sensing mode and when the number of second probes in the vicinity of the first probe apparatus does not satisfy the threshold condition (e.g., is not greater than the threshold value), the first probe apparatus is operated in the obfuscation mode. When operating in a sensing mode, the first probe apparatus may provide one or more instances of probe information/data that are complete and/or include more information/data than when the first probe apparatus operates in the obfuscation mode. When operating in an obfuscation mode, the first probe apparatus may contribute to one or more instances of collaborative probe information/data.

When operating in the sensing mode, the probe apparatus may generate and provide instances of individual probe information/data. In various embodiments, an instance of individual probe information/data may include a position of the probe apparatus (e.g., a geolocation of the apparatus such as latitude and longitude), a heading of the probe apparatus, a portion of a trajectory of a probe apparatus (e.g., a time-ordered sequence of positions of the probe apparatus), a velocity of the probe apparatus, a vehicle braking information/data, and/or any other elements of information/data corresponding to sensor information/data captured by one or more sensors in communication with the probe apparatus.

When operating in the obfuscation mode, the probe apparatus may contribute to one or more instances of collaborative probe information/data. In an example embodiment, an instance of collaborative probe information/data is generated through a collaborative process where multiple probe apparatuses contribute information/data to the instance of collaborative probe information/data. For example, the probe apparatus may receive a partial and/or incomplete instance of collaborative probe information/data from an analysis apparatus. The probe apparatus may contribute to the partial and/or incomplete instance of collaborative probe information/data such that the partial and/or incomplete instance of collaborative probe information/data may become a completed instance of collaborative probe information/data (e.g., via the contributions of a two or more probe apparatuses). In various embodiments, the probe apparatus may generate and provide a partial and/or incomplete instance of collaborative probe information/data to the analysis apparatus. In various embodiments, a completed instance of collaborative probe information/data may be analyzed by the analysis apparatus to generate and/or determine traffic and/or map information/data. In various embodiments, a probe apparatus may receive a completed instance of collaborative probe information/data such that probe apparatus may attest to and/or confirm the completed instance of collaborative probe information/data. In various embodiments, the attestations and/or confirmations of completed instances of collaborative probe information/data and contributions to partial and/or incomplete instances of collaborative probe information/data may be used to determine traffic volume information/data for the corresponding portion of the road network (e.g., portion of a TME).

Various embodiments provide methods, apparatus, systems, computer program products and/or the like configured to generating and/or determining traffic and/or map information/data based on probe information/data. For example, an analysis apparatus receives a plurality of instances of probe information/data from a plurality of probe apparatuses. The analysis apparatus may analyze the instances of probe information/data to determine the traffic and/or map information/data and provide the traffic and/or map information/data to one or more probe apparatuses and/or other consumer apparatuses. In various embodiments, the instances of probe information/data include one or more instances of collaborative probe information/data (e.g., generated by two or more probe apparatuses) and/or one or more instances of individual probe information/data (e.g., generated by a single probe apparatus). In an example embodiment, an instance of collaborative probe information/data comprises information/data describing a portion of a road network. For example, in an example embodiment, an instance of collaborative probe information/data includes a starting point (e.g., defined by a starting latitude and a starting longitude), an ending point (e.g., defined by an ending latitude and ending longitude), and a velocity for a small portion of a road network (e.g., corresponding to a portion of a TME (e.g., road segment and/or travel lane of a road segment) traversed by the contributing probe apparatuses and/or corresponding vehicles. In various embodiments, the contributing probe apparatuses are operating in an obfuscation mode.

FIG. 1 provides an illustration of an example system that can be used in conjunction with various embodiments of the present invention. As shown in FIG. 1, the system may include one or more analysis apparatuses 10, a plurality of probe apparatuses 20 (e.g., 20A, 20B), wherein each probe apparatus 20 is disposed on a vehicle 5, one or more consumer apparatuses 30, one or more networks 50, and/or the like. In various embodiments, a consumer apparatus 30 may be a mobile computing entity and/or mobile apparatus. For example, a consumer apparatus 30 may be a probe apparatus 20 or another computing entity. In various embodiments, the probe apparatus 20 may be an in vehicle navigation system, vehicle control system, a mobile computing device, a mobile data gathering platform, and/or the like. For example, a probe apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like.

In various embodiments, the probe apparatus 20 is configured to autonomously drive a vehicle 5 may perform multiple functions that are similar to those performed by a probe apparatus 20 configured to be an ADAS (e.g., lane keeping, lane change assistance, maintaining a lane, merging, etc.). In some embodiments, a probe apparatus 20 may be onboard a personal vehicle, commercial vehicle, public transportation vehicle, fleet vehicle, and/or other vehicle. In various embodiments, the probe apparatus 20 may be a smartphone, tablet, personal digital assistant (PDA), personal computer, desktop computer, laptop, and/or other mobile computing device. In an example embodiment, the probe apparatus 20 are onboard fleet vehicles and comprise a mobile data gathering platform. In an example embodiment, a consumer apparatus 30 is a probe apparatus and/or other computing entity configured to perform one or more navigation functions.

In an example embodiment, the analysis apparatus 10 may be a server, group of servers, distributed computing system, and/or other computing system. In an example embodiment, the analysis apparatus 10 is not located onboard a vehicle. For example, the analysis apparatus 10 may be in communication with one or more probe apparatuses 20, one or more consumer apparatuses 30, and/or the like via one or more wired or wireless networks 50.

In an example embodiment, an analysis apparatus 10 may comprise components similar to those shown in the example analysis apparatus 10 diagrammed in FIG. 2A. In an example embodiment, the analysis apparatus 10 is configured to receive instances of individual probe information/data from one or more probe apparatuses 20, receive and/or provide partial/incomplete and/or complete instances of collaborative probe information/data, generate and/or determine traffic and/or map information/data based on received instances of probe information/data (e.g., including partial/incomplete and/or complete instances of collaborative probe information/data), provide the traffic and/or map information/data (e.g., to one or more consumer apparatuses 30), and/or the like. For example, as shown in FIG. 2A, the analysis apparatus 10 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs) and one or more graphics processing units (GPUs).

In an example embodiment, a probe apparatus 20 is onboard a vehicle 5. In an example embodiment, the probe apparatus 20 may be configured to capture sensor information/data via one or more sensors onboard the vehicle 5, determine whether to operate in a sensing mode or an obfuscation mode (e.g., based on a number of second probe apparatuses in the vicinity of the probe apparatus), generate instances of individual probe information/data based on the sensor information/data when operating in the sensing mode, generate and/or update partial and/or incomplete instances of collaborative probe information/data when operating in the obfuscation mode, and provide the instances of probe information/data (e.g., instances of individual and/or collaborative probe information/data) such that an analysis apparatus 10 receives the instances of probe information/data. In an example embodiment, the probe apparatus 20 is configured to determine location information/data (e.g., geo-location such as latitude and longitude and/or the like) indicating a location of the vehicle 5 and/or probe apparatus 20 when the corresponding sensor information/data was captured. In an example, location information/data indicates a position and/or heading of the vehicle 5 at the time the sensor information/data was captured. In an example embodiment, the probe apparatus 20 is configured to determine a timestamp indicating the date and/or time that the instance of sensor information/data was captured. In various embodiments, an instance of individual probe information/data comprises the location information/data indicating a location of the probe apparatus 20 when the instance of individual probe information/data was captured, the timestamp indicating the date and/or time at which the instance of individual probe information/data was captured, and a session identifier (e.g., a unique pseudo-identifier) configured to enable the analysis apparatus 10 to identify instances of individual probe information/data generated by the same probe apparatus 20 during a single trip and/or ignition cycle of a corresponding probe vehicle 5. In various embodiments, the instance of individual probe information/data may further comprise speed information/data indicating a travel speed of the probe apparatus 20, information/data captured by one or more sensors onboard the vehicle 5, a result of analysis of information/data captured by one or more sensors onboard the vehicle 5, and/or the like.

In an example embodiment, as shown in FIG. 2B, the probe apparatus 20 may comprise a processor 22, memory 24, a communications interface 26, a user interface 28, one or more sensors 29 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, a consumer apparatus 30 is configured to consume traffic and/or map information/data. For example, a consumer apparatus 30 may be configured to receive traffic and/or map information/data and perform one or more navigation functions using at least a portion of the traffic and/or map information/data as an input for performing the one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like. In an example embodiment, the consumer apparatus 30 is a probe apparatus 20, a mobile computing entity, a server, and/or other computing entity. In an example embodiment, the consumer apparatus 30 may be configured to receive map and/or traffic information/data as part of a digital map and/or one or more digital map tiles. In an example embodiment, the consumer apparatus 30 may comprise a processor, memory, a communications interface, a user interface, one or more sensors, and/or other components configured to perform various operations, procedures, functions or the like described herein. In at least some example embodiments, the memory is non-transitory.

In an example embodiment, the analysis apparatus 10 may be in communication with one or more of probe apparatuses 20, and/or one or more consumer apparatuses 30. In an example embodiment, the analysis apparatus 10 may receive instances of probe information/data, generate and/or determine traffic and/or map information/data and provide the traffic and/or map information/data. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20 and/or consumer apparatus 30 may be in communication with an analysis apparatus 10 via the network 50. For example, a probe apparatus 20 and/or consumer apparatus 30 may communicate with the analysis apparatus 10 via a network, such as the Cloud. For example, the Cloud may be a computer network that provides shared computer processing resources and data to computers and other devices connected thereto. For example, the probe apparatus 20 may be configured to provide one or more instances of probe information/data via the network 50. For example, the analysis apparatus 10 may configured to receive a plurality of instances of probe information/data, and provide traffic and/or map information/data, and/or digital maps and/or digital maps tiles comprising traffic and/or map information/data via the network 50. For example, a consumer apparatus 30 may be configured to receive traffic and/or map information/data, and/or digital maps and/or digital maps tiles comprising traffic and/or map information/data via the network 50.

Certain example embodiments of the analysis apparatus 10, probe apparatus 20, and/or consumer apparatus 30 are described in more detail below with respect to FIGS. 2A and 2B.

II. Example Operation

Example embodiments provide methods, apparatus, systems, computer program products, and/or the like for generating and/or determining traffic and/or map information/data (e.g., for use in performing navigation functions) based on probe information/data. Example embodiments provide methods, apparatus, systems, computer program products, and/or the like for selecting an operating mode (e.g., obfuscation mode or sensing mode) and providing and/or contributing to instances of probe information/data based on the selected operating mode. Example embodiments provide methods, apparatus, systems, computer program products, and/or the like for generating instances of collaborative probe information/data through the contributions of a plurality (e.g., two or more) probe apparatuses 20.

a. Selecting an Operating Mode

In various embodiments, a first probe apparatus 20A may select an operating mode from a plurality of operating modes based on the number of second probe apparatuses 20B in the vicinity of the first probe apparatus 20A. In an example embodiment, the plurality of operating modes comprise a sensing mode. When operating in the sensing mode, the first probe apparatus 20A may provide instances of individual probe information/data. In various embodiments, an instance of individual probe information/data comprises the location information/data indicating a location of the first probe apparatus 20A when the instance of individual probe information/data was captured, the timestamp indicating the date and/or time at which the instance of individual probe information/data was captured, and a session identifier (e.g., a unique pseudo-identifier) configured to enable the analysis apparatus 10 to identify instances of individual probe information/data generated by the same first probe apparatus 20A during a single trip and/or ignition cycle of a corresponding probe vehicle 5. In various embodiments, the instance of individual probe information/data may further comprise speed information/data indicating a travel speed of the first probe apparatus 20A, information/data captured by one or more sensors onboard the vehicle 5, a result of analysis of information/data captured by one or more sensors onboard the vehicle 5, and/or the like. For example, an instance of individual probe information/data may include a position of the first probe apparatus 20A (e.g., a geolocation of the apparatus such as latitude and longitude), a heading of the first probe apparatus 20A, a portion of a trajectory of a first probe apparatus 20A (e.g., a time-ordered sequence of positions of the first probe apparatus), a velocity of the first probe apparatus 20A, a vehicle braking information/data, and/or any other elements of information/data corresponding to sensor information/data captured by one or more sensors 29 in communication with the first probe apparatus 20A. In various embodiments, the probe information/data provided in an instance of individual probe information/data is accurate to the sensor information/data captured by the one or more sensors 29 of the probe apparatus 20.

In an example embodiment, the plurality of operating modes comprise an obfuscation mode. When operating in the obfuscation mode, the first probe apparatus 20A may contribute to instances of collaborative probe information/data, in an example embodiment. In another example embodiment, when operating in the obfuscation mode, the first probe apparatus 20A may provide obfuscated instances of probe information/data where the provided probe information/data has been modified based on a noise distribution to provide an approximation of probe information/data determined based on the sensors 29 of the first probe apparatus 20A. In various embodiments, an obfuscated instanced of probe information/data may be an instance of collaborative information/data. In various embodiments, an instance of collaborative information/data defines a portion of a trajectory of a first probe apparatus 20A. For example, an instance of collaborative information/data may comprise information/data defining at least a portion of a TME. For example, the instance of collaborative information/data may comprise a starting point (e.g., starting latitude and starting longitude) and an ending point (e.g., ending latitude and ending longitude) of a line describing the portion of the trajectory and/or TME. In various embodiments, the instance of collaborative probe information/data may further comprise information/data corresponding to one or more travel features (e.g., features of the TME, portion of the trajectory, and/or the first probe apparatus' 20A travel along the TME and/or portion of the trajectory). For example, an instance of collaborative probe information/data may include a representative velocity (e.g., average velocity and/or the like) with which the first probe apparatus 20A traversed the TME and/or portion of the trajectory.

In various embodiments, a first probe apparatus 20A may store (e.g., in memory 24) information/data defining a volume threshold requirement. For example, the first probe apparatus 20A may store a volume threshold value. In various embodiments, the information/data defining the volume threshold requirement may be set by a manufacturer of the first probe apparatus 20A, a user of the first probe apparatus 20A, and/or the like. For example, a first probe apparatus 20A being onboard a public transportation bus may have a relatively low volume threshold value as the probe information/data provided by the first probe apparatus 20A would correspond to a plurality of people, rather than to an individual or family. In comparison, a first probe apparatus 20A onboard a personal vehicle (e.g., a motorcycle), may have a comparatively high volume threshold (e.g., compared to the first probe apparatus 20A onboard the public transportation bus). The first probe apparatus 20A may then use the information/data defining the volume threshold requirement to select an operating mode (e.g., obfuscation mode, sensing mode). For example, when the volume threshold requirement is satisfied (e.g., there is a sufficiently large number of second probe apparatuses 20B in the vicinity of a first probe apparatus 20A), the first probe apparatus 20A may operate in the sensing mode. For example, when the volume threshold requirement is not satisfied (e.g., there is not a sufficiently large number of second probe apparatuses 20B in the vicinity of the first probe apparatus 20A), the first probe apparatus 20A may operate in the obfuscation mode.

In various embodiments, an analysis apparatus 10 may define zones within a geographical area. In various embodiments, a first probe apparatus 20A may define a zone about the first probe apparatus 20A. For example, the first probe apparatus 20A may define a zone that is a circle defined by a physical radius d and centered on the position of the first probe apparatus 20A. As should be understood, the zones defined by the first probe apparatus 20A and/or the analysis apparatus 10 may have various geometries. In various embodiments, when a first probe apparatus 20A is within a first zone, a second probe apparatus 20B is in the vicinity of a first probe apparatus 20A if the second probe apparatus 20B is currently within the first zone and/or if the second probe apparatus 20B was located within the first zone at time within a time radius of the current time. For example, if the first probe apparatus 20A is located within a first zone at time $t_1$ and the temporal radius is a time interval $\Delta t$, the second probe apparatus 20B is in the vicinity of the first probe apparatus 20A if the second probe apparatus 20B was located within the first zone in the time window defined by $t_1 - \Delta t$ and $t_1$. In an example embodiment, a first probe apparatus 20A may determine the number of second apparatuses 20B in the vicinity of the first probe apparatus 20A based zone information/data provided analysis apparatus 10. For example, the analysis apparatus 10 may provide zone information/data indicating a number of second probe apparatuses 20B that have provided and/or contributed to instances of probe information/data (e.g., instances of individual probe information/data, instances of collaborative probe information/data, and/or obfuscated instances of probe information/data) in the time window defined by $t_1 - \Delta t$ and $t_1$, wherein $t_1$ is the time at which analysis apparatus 10 is generating and/or providing zone information/data. In various embodiments, the zone information/data may comprise one or more instances of collaborative probe information/data. For example, the analysis apparatus 10 may provide one or more instances of collaborative probe information/data from which the first probe apparatus 20A may select an instance of collaborative probe information/data to update by providing a contribution.

FIG. 3 provides a flowchart illustrating various operations performed by a first probe apparatus 20A to select an operating mode and operate under the selected operating mode. For example, a first probe apparatus 20A may be traversing a route through at least a portion of a road network, possibly onboard a vehicle 5. Starting at block 302, the first probe apparatus 20A may request and/or receive zone information/data. For example, the first probe apparatus 20A may request zone information/data and the analysis apparatus 10 may provide the zone information/data such that the first probe apparatus 20A receives the zone information/data. For example, if the zones are predefined by, for example, the analysis apparatus 10, the first probe apparatus 20A may request zone information/data for a particular zone (e.g., using a zone identifier configured to identify the particular zone, and/or the like). In another example embodiment, the analysis apparatus 10 may push zone information/data corresponding to one or more zones such that the first probe apparatus 20A receives the zone information/data (e.g., without making an explicit request for the zone information/data). In various embodiments, the first probe apparatus 20A may comprise means, such as processor 22, memory 24, communication interface 26, and/or the like, for requesting and/or receiving zone information/data. In various embodiments, the received zone information/data comprises zone information/data corresponding to the first probe apparatus 20A (e.g., corresponding to the zone that the first probe apparatus 20A is located within).

In various embodiments, the zone information/data corresponding to a zone indicates a number of second probe apparatuses 20B located within the zone (e.g., within the time window defined by $t_1 - \Delta t$ and $t_1$, where $t_1$ is the current time and/or the time at which the analysis apparatus 10 is generating and/or providing zone information/data). For example, the zone information/data corresponding to a zone may indicate a number of second probe apparatuses 20B locate within the zone by indicating the number of second probe apparatuses 20B that have provided and/or contributed to instances of probe information/data (e.g., instances of individual probe information/data, instances of collaborative probe information/data, and/or obfuscated instances of probe information/data) in the time window defined by $t_1 - \Delta t$ and $t_1$, wherein $t_1$ is the current time and/or the time at which the analysis apparatus 10 is generating and/or providing zone information/data. In various embodiments, the zone information/data may comprise one or more instances of collaborative probe information/data. For example, the analysis apparatus 10 may provide one or more instances of collaborative probe information/data from which the first probe apparatus 20A may select an instance of collaborative probe information/data to update by providing a contribution.

At block 304, based on the indication of the number of second probe apparatuses 20B located within the zone, it may be determined whether the volume threshold requirement is satisfied. For example, the first probe apparatus 20A may determine whether the volume threshold requirement is satisfied. For example, the first probe apparatus 20A may comprise means, such as processor 22, memory 24, and/or the like, for determining whether the volume threshold requirement is satisfied. For example, the first probe apparatus 20A may determine whether the volume threshold requirement is satisfied based on a comparison of the indication of the number of second probe apparatuses 20B located within the zone corresponding to the first probe apparatus 20A provided as part of the zone information/data with the volume threshold value stored by the first probe apparatus 20A.

When, at block 304, it is determined that the volume threshold requirement is satisfied, the process continues to block 306 and the sensing mode is selected. For example, when the zone information/data corresponding to the zone corresponding to the first probe apparatus 20A indicates that a number of second probe apparatuses 20B that is larger than the volume threshold value are located within the zone, the first probe apparatus 20A is operated in the sensing mode at block 306. In various embodiments, when operating in the sensing mode, the first probe apparatus 20A may generate and provide one or more instances of individual probe information/data. For example, as the first probe apparatus 20A and/or corresponding vehicle 5 traverses at least a portion of the road network, one or more sensors 29 may capture sensor information/data and communicate the sensor information/data to the first probe apparatus 20A. For example, the first probe apparatus 20A may capture sensor information/data. For example, the first probe apparatus 20A may comprise means, such as the processor 22, memory 24, sensors 29, and/or the like, for capturing sensor information/data. In various embodiments, the sensor information/data describes at least a portion of the environment surrounding the vehicle 5. For example, the sensor information/data may comprise GNSS information/data, digital images, lidar point clouds, radar point clouds, ultrasonic information/data, electromagnetic information/data, thermal information/data, and/or the like. In various embodiments, the first probe apparatus 20A may concurrently determine location information/data indicating a position and/or heading of the vehicle 5 and/or the first probe apparatus 20A and a timestamp corresponding to the date and/or time at which the location information/data is determined and sensor information/data is captured. For example, the first probe apparatus 20A may determine a location information/data determining the position and/or heading of the vehicle 5 and/or the first probe apparatus 20A based on GNSS information/data, IMU sensor information/data, visual odometry (e.g., based on one or more digital images), and/or other localization techniques and/or a combination thereof. In various embodiments, the first probe apparatus 20A comprises and/or is communication with an apparatus comprising a clock such that the first probe apparatus 20A may determine a timestamp corresponding to the date and/or time at which the location of the vehicle 5 and/or the first probe apparatus 20A is determined and the sensor information/data is captured.

In various embodiments, the first probe apparatus 20A may generate an instance of individual probe information/data based on the sensor information/data captured at the date and/or time indicated by the timestamp. In various embodiments, an instance of individual probe information/data comprises the location information/data indicating a position and/or heading of the vehicle 5 and/or first probe apparatus 20A when the instance of individual probe information/data was captured, the timestamp indicating the date and/or time at which the instance of individual probe information/data was captured, and a session identifier configured to enable the analysis apparatus 10 to link instances of probe individual information/data generated by the first probe apparatus 20A and/or the same probe apparatus 20A during a single trip and/or ignition cycle of a corresponding probe vehicle 5. In various embodiments, the instance of individual probe information/data may further comprise speed information/data indicating a travel speed of the probe apparatus 20, information/data captured by one or more sensors onboard the vehicle 5, a result of analysis of information/data captured by one or more sensors onboard the vehicle 5, and/or the like. In various embodiments, the probe information/data provided in an instance of individual probe information/data is accurate to the sensor information/data captured by the one or more sensors 29 of the probe apparatus 20.

The generated instance of individual probe information/data may be provided such that the analysis apparatus 10 receives the instance of individual probe information/data. For example, the first probe apparatus 20A may provide the instance of individual probe information/data such that an analysis apparatus 10 receives the instance of individual probe information/data. For example, the first probe apparatus 20A may comprise means, such as processor 22, memory 24, communications interface 26, and/or the like, for providing an instance of individual probe information/data such that the analysis apparatus 10 receives the instance of individual probe information/data. In various embodiments, the first probe apparatus 20A generates instances of probe individual information/data in response to a trigger (e.g., corresponding to a location of the vehicle 5 and/or probe apparatus 20 and/or a particular time) and/or periodically/regularly (e.g., based a time step and/or distance traveled interval).

When, at block 304, it is determined that the volume threshold requirement is not satisfied, the process continues to block 308 and the obfuscation mode is selected. For example, when the zone information/data corresponding to the zone corresponding to the first probe apparatus 20A indicates that a number of second probe apparatuses 20B that is not larger than the volume threshold value are located within the zone, the first probe apparatus 20A is operated in the obfuscation mode at block 308. In various embodiments, when operating in the obfuscation mode, the first probe apparatus 20A may contribute to existing instances of collaborative probe information/data, contribute new instances of collaborative probe information/data, and/or provide obfuscated instances of probe information/data. The operation of the first probe apparatus 20A in obfuscation mode is described in more detail herein with respect to FIG. 5.

In various embodiments, as the first probe apparatus 20A operates in the sensing mode or obfuscation mode, the first probe apparatus 20A may regularly, periodically, between providing and/or contributing to each instance of probe information/data, and/or the like, determine if the first probe apparatus 20A has exited a zone and/or entered a new zone. For example, the zone that the first probe apparatus 20A was immediately previously located in may be known and the zone that the first probe apparatus 20A is currently located in may be determined. It may then be determined if the zone that the first probe apparatus 20A was immediately previously located in is the same as the zone the first probe apparatus 20a is currently located in. If the two zones are the same, the first probe apparatus 20A has not exited a zone and/or entered a new zone and if the two zones are different, the first probe apparatus 20A has exited a zone and/or entered a new zone. When it is determined that the first probe apparatus 20A has exited a zone and/or entered a new zone, the process may return to block 302 such that the first probe apparatus 20A may select an operating mode (e.g., sensing mode, obfuscation mode) for operating within the new zone.

In various embodiments, the first probe apparatus 20A may operate in the same operating mode for the extent of time the first probe apparatus 20A is located within a zone. In various embodiments, the first probe apparatus 20A may access the number of second probe apparatuses 20B in the vicinity of the first probe apparatus 20A on a regular and/or periodic basis (e.g., based on a time step and/or distance traveled) and/or in response to a trigger (e.g., a function class of a TME being traveled along by the first probe apparatus 20A changes). For example, the first probe apparatus 20A may operate in the sensing mode and/or obfuscation mode (e.g., block 306 or block 308) for a time and, based on a time step and/or distance traveled, may return to block 302 to receive zone information/data indicating a number of second probe apparatuses 20B in the same zone and/or in the vicinity of the first probe apparatus 20A. For example, when the first probe apparatus 20A is traveling along an interstate or other heavily traveled highway, a large number of second probe apparatuses 20B may be in the vicinity of the first probe apparatus 20A and the first probe apparatus 20A may be operated in the sensing mode. When the first probe apparatus 20A exits the highway and begins to traverse a residential road, the first probe apparatus 20A may be triggered to return to block 302 and to determine whether the first probe apparatus 20A should continue operating in the sensing mode or should switch to operating in the obfuscation mode.

FIG. 4 provides a flowchart illustrating various operations performed by a first probe apparatus 20A to select an operating mode based on peer-to-peer communications. Starting at block 402, as the first probe apparatus 20A traverses at least a portion of the road network, and determines and/or infers the number of second probe apparatuses 20B in the vicinity of the first probe apparatuses 20A based on peer-to-peer communications. For example, the first probe apparatus 20A may receive signals of a short and/or medium range communication protocol provided (e.g., transmitted) by second probe apparatuses 20B. The number of second probe apparatuses 20B in the vicinity of the first probe apparatus 20A may be determined and/or inferred based on the number of signals of the short and/or medium range communication protocol are received by the first probe apparatus 20A during a time period. For example, a probe apparatus 20 (e.g., first probe apparatus 20A, second probe apparatus 20B) may periodically emit and/or transmit a signal of the short and/or medium range communication protocol indicating the presence of the probe apparatus 20. For example, the first probe apparatus 20A may determine and/or infer a number of second probe apparatuses 20B in the vicinity of the first probe apparatus 20A based on the number of signals of the short and/or medium range communication protocol are received by the first probe apparatus 20A during a time period. For example, the first probe apparatus 20A may comprise means, such as processor 22, memory 24, communication interface 26, and/or the like, for determining and/or inferring a number of second probe apparatuses 20B in the vicinity of the first probe apparatus 20A based on peer-to-peer communications (e.g., short and/or medium range communication protocols).

At block 404, based on the determined and/or inferred number of second probe apparatuses 20B located within the zone, it may be determined whether the volume threshold requirement is satisfied. For example, the first probe apparatus 20A may determine whether the volume threshold requirement is satisfied. For example, the first probe apparatus 20A may comprise means, such as processor 22, memory 24, and/or the like, for determining whether the volume threshold requirement is satisfied. For example, the first probe apparatus 20A may determine whether the volume threshold requirement is satisfied based on a comparison of the determined and/or inferred number of second probe apparatuses 20B located within the vicinity of the first probe apparatus 20A.

When, at block 404, it is determined that the volume threshold requirement is satisfied, the process continues to block 406 and the sensing mode is selected. For example, when the determined and/or inferred number of second probe apparatuses 20B in the vicinity of the first probe apparatus 20A is larger than the volume threshold value, the first probe apparatus 20A is operated in the sensing mode at block 406. In various embodiments, when operating in the sensing mode, the first probe apparatus 20A may generate and provide one or more instances of individual probe information/data. For example, as the first probe apparatus 20A and/or corresponding vehicle 5 traverses at least a portion of the road network, one or more sensors 29 may capture sensor information/data and communicate the sensor information/data to the first probe apparatus 20A. For example, the first probe apparatus 20A may capture sensor information/data. For example, the first probe apparatus 20A may comprise means, such as the processor 22, memory 24, sensors 29, and/or the like, for capturing sensor information/data. In various embodiments, the sensor information/data describes at least a portion of the environment surrounding the vehicle 5. For example, the sensor information/data may comprise GNSS information/data, digital images, lidar point clouds, radar point clouds, ultrasonic information/data, electromagnetic information/data, thermal information/data, and/or the like. In various embodiments, the first probe apparatus 20A may concurrently determine location information/data indicating a position and/or heading of the vehicle 5 and/or the first probe apparatus 20A and a timestamp corresponding to the date and/or time at which the location information/data is determined and sensor information/data is captured. For example, the first probe apparatus 20A may determine a location information/data determining the position and/or heading of the vehicle 5 and/or the first probe apparatus 20A based on GNSS information/data, IMU sensor information/data, visual odometry (e.g., based on one or more digital images), and/or other localization techniques and/or a combination thereof. In various embodiments, the first probe apparatus 20A comprises and/or is communication with an apparatus comprising a clock such that the first probe apparatus 20A may determine a timestamp corresponding to the date and/or time at which the location of the vehicle 5 and/or the first probe apparatus 20A is determined and the sensor information/data is captured.

In various embodiments, the first probe apparatus 20A may generate an instance of individual probe information/data based on the sensor information/data captured at the date and/or time indicated by the timestamp. In various embodiments, an instance of individual probe information/data comprises the location information/data indicating a position and/or heading of the vehicle 5 and/or first probe apparatus 20A when the instance of individual probe information/data was captured, the timestamp indicating the date and/or time at which the instance of individual probe information/data was captured, and a session identifier configured to enable the analysis apparatus 10 to link instances of probe individual information/data generated by the first probe apparatus 20A and/or the same probe apparatus 20A during a single trip and/or ignition cycle of a corresponding probe vehicle 5. In various embodiments, the instance of individual probe information/data may further comprise speed information/data indicating a travel speed of the probe apparatus 20, information/data captured by one or more sensors onboard the vehicle 5, a result of analysis of information/data captured by one or more sensors onboard the vehicle 5, and/or the like. In various embodiments, the probe information/data provided in an instance of individual probe information/data is accurate to the sensor information/data captured by the one or more sensors 29 of the probe apparatus 20.

The generated instance of individual probe information/data may be provided such that the analysis apparatus 10 receives the instance of individual probe information/data. For example, the first probe apparatus 20A may provide the instance of individual probe information/data such that an analysis apparatus 10 receives the instance of individual probe information/data. For example, the first probe apparatus 20A may comprise means, such as processor 22, memory 24, communications interface 26, and/or the like, for providing an instance of individual probe information/data such that the analysis apparatus 10 receives the instance of individual probe information/data. In various embodiments, the first probe apparatus 20A generates instances of probe individual information/data in response to a trigger (e.g., corresponding to a location of the vehicle 5 and/or probe apparatus 20 and/or a particular time) and/or periodically/regularly (e.g., based a time step and/or distance traveled interval).

When, at block 404, it is determined that the volume threshold requirement is not satisfied, the process continues to block 408 and the obfuscation mode is selected. For example, when the determined and/or inferred number of second probe apparatuses 20B in the vicinity of the first probe apparatus 20A is not larger than the volume threshold value, the first probe apparatus 20A is operated in the obfuscation mode at block 408. In various embodiments, when operating in the obfuscation mode, the first probe apparatus 20A may contribute to existing instances of collaborative probe information/data, contribute new instances of collaborative probe information/data, and/or provide obfuscated instances of probe information/data. The operation of the first probe apparatus 20A in obfuscation mode is described in more detail herein with respect to FIG. 5.

In various embodiments, the first probe apparatus 20A may continuously and/or periodically monitor the number of second probe apparatuses 20B in the vicinity of the first probe apparatus 20A. For example, the first probe apparatus 20A may continuously receive signals transmitted in a short and/or medium range communication protocol and continuously and/or periodically determine and/or infer a number of second probe apparatuses 20B in the vicinity of the first probe apparatus 20A based on the signals received during a time period. The first probe apparatus 20A may continuously and/or periodically evaluate whether to operate in the obfuscation mode or the sensing mode based on the determined and/or inferred number of second probe apparatuses 20B in the vicinity of the first probe apparatus 20A.

b. Operation of a Probe Apparatus in Obfuscation Mode

In various embodiments, a probe apparatus 20 may operate in obfuscation mode. In particular, a first probe apparatus 20A may operate in obfuscation mode when the number of second probe apparatuses 20B in the vicinity of the first probe apparatus 20A is not sufficiently large (e.g., the volume threshold requirement is not satisfied). For example, when the number of second probe apparatuses 20B in a particular zone is low, a first probe apparatus 20A located within the particular zone may operate in the obfuscation mode so as to protect the privacy of the corresponding user. In various embodiments, the operation of a probe apparatus 20 in the obfuscation mode includes at least one of contributing to instances of collaborative probe information/data or providing obfuscated instances of probe information/data. In various embodiments, contributing to an instance of collaborative probe information/data may include adding to an instance of collaborative probe information/data and/or providing a new instance of collaborative probe information/data. In various embodiments, an obfuscated instance of probe information/data comprises probe information/data that is modified based on a noise distribution to provide an approximation of probe information/data determined based on the sensors 29 of the probe apparatus 20. In an example embodiment, an obfuscated instance of probe information/data may be an instance of collaborative probe information/data. For example, the probe information/data determined based on the sensors 29 of the probe apparatus 20 may be modified based on a noise distribution and the modified probe information/data may be used to contribute to an instance of collaborative probe information/data.

In various embodiments, an instance of collaborative probe information/data comprises probe information/data defining at least a portion of a TME. For example, the instance of collaborative probe information/data may comprise a starting point (e.g., starting latitude and starting longitude) and an ending point (e.g., ending latitude and ending longitude) of a line describing the portion of the trajectory and/or TME. In various embodiments, the instance of collaborative probe information/data may further comprise probe information/data corresponding to one or more travel features (e.g., features of the TME, portion of the trajectory, and/or the probe apparatus' 20 travel along the TME and/or portion of the trajectory). For example, the probe information/data of an instance of collaborative probe information/data may include a representative velocity (e.g., average velocity and/or the like) with which the probe apparatus 20 traversed the TME and/or portion of the trajectory. In an example embodiment, the probe information/data of an instance of collaborative probe information/data consists of a starting latitude, starting longitude, ending latitude, ending longitude, and velocity. In various embodiments, an instance of collaborative probe information/data does not include a session identifier and/or other identifier or pseudo-identifier corresponding to a contributing probe apparatus. In various embodiments, an instance of collaborative probe information/data may be associated with and/or include a number of contributors that indicates the number of probe apparatuses 20 that have contributed to and/or confirmed the instance of collaborative probe information/data.

In an example embodiment, an instance of collaborative probe information/data comprises at least some bits of a bitwise representation of the probe information/data. For example, the probe information/data may be encoded into a bitwise representation (e.g., using an encoding function configured to provide a binary representation of at least one element of probe information/data in a particular projection and using particular units and/or the like). For example, a first probe apparatus 20A may generate a new instance of collaborative probe information/data by generating the probe information/data (e.g., using sensors 29 and/or the like), encoding the probe information/data into a bitwise representation of the probe information/data, and generating an instance of collaborative probe information/data comprising some but not all of the bits of the bitwise representation of the probe information/data. The first probe apparatus 20A may then provide (e.g., transmit) the generated instance of collaborative probe information/data such that the analysis apparatus 10 receives the instance of collaborative probe information/data. The analysis apparatus 10 may provide the instance of collaborative probe information/data to one or more second probe apparatuses 20B. A second probe apparatus 20B may determine that the bits of the instance of collaborative probe information/data match the bitwise representation of probe information/data generated and encoded (e.g., into the bitwise representation) by the second probe apparatus 20B. The second probe apparatus 20B may add one or more bits of the bitwise representation of the probe information/data to the instance of collaborative probe information/data and provide (e.g., transmit) the updated instance of collaborative probe information/data such that the analysis apparatus 10 receives the updated instance of collaborative probe information/data. Thus, an instance of collaborative probe information/data may be generated via the contributions of two or more probe apparatuses 20.

In various embodiments, each element of the probe information/data of the instance of collaborative probe information/data is encoded into a separate bitwise representation. For example, the starting latitude may be encoded into a bitwise representation of the starting latitude and the starting longitude may be encoded into a separate bitwise representation of the starting longitude. In an example embodiment, a bitwise representation of two or more elements of the probe information/data of the instance of collaborative probe information/data is encoded into a combined bitwise representation. For example, a single bitwise representation may be generated that encodes the starting latitude and starting longitude or that encodes all of the starting latitude, starting longitude, ending latitude, ending longitude, and velocity.

In various embodiments, the first probe apparatus 20A that generates an instance of collaborative probe information/data may contribute the least significant bits of the bitwise representation of the probe information/data. In various embodiments, the least significant bits are the bits which encode the smallest value difference in the value of the corresponding element of probe information/data. The first probe apparatus 20A may contribute one or more least significant bits for the instance of collaborative probe information/data.

When the second probe apparatus 20B contributes to the instance of collaborative probe information/data by adding additional bits of the bitwise representation of the probe information/data to the instance of collaborative probe information/data, the second probe apparatus 20B adds the next least significant bits. In various embodiments, the next least significant bits are the bits that are not already present in the element of probe information/data that encode the smallest value difference in the value of the corresponding element. For example, the next least significant bits are the least significant bits that are not already present for the element in the instance of collaborative probe information/data. The second probe apparatus 20B may contribute one or more next least significant bits for the instance of collaborative probe information/data.

An instance of collaborative probe information/data that does not include all of the bits of the bitwise representation of the probe information/data is considered a partial or incomplete instance of collaborative probe information/data. An instance of collaborative probe information that does include all of the bits of the bitwise representation of the probe information/data is considered a complete instance of collaborative probe information/data. In various embodiments, the instance of collaborative probe information/data may indicate the number of bits of the bitwise representation and/or the bitwise representation of the probe information/data may have a predetermined and/or set number of bits. In various embodiments, the analysis apparatus 10 may provide partial/incomplete and/or complete instances of collaborative probe information/data as part of the zone information/data. When a probe apparatus 20 operating in the obfuscation mode determines that a partial/incomplete instance of collaborative probe information/data is a match for probe information/data generated by the probe apparatus 20, the probe apparatus 20 may contribute to the partial/incomplete instance of collaborative probe information/data by adding one or more bits of the bitwise representation to the instance of collaborative probe information/data. When a probe apparatus 20 operating in the obfuscation mode determines that a complete instance of collaborative probe information/data is a match for probe information/data generated by the probe apparatus 20, the probe apparatus 20 confirm the instance of collaborative probe information/data. For example, the probe apparatus 20 may confirm the instance of collaborative probe information/data by providing the instance of collaborative probe information/data and/or a collaborative instance identifier configured to identify the instance of collaborative probe information/data such that the analysis apparatus 10 receives the confirmation. When a probe apparatus 20 operating in the obfuscation mode determines that none of the instances of collaborative probe information/data provided as part of the zone information/data is a match for probe information/data generated by the probe apparatus 20, the probe apparatus 20 may generate and provide a new partial/incomplete instance of collaborative probe information/data.

FIG. 5 provides a flowchart illustrating operations performed by a first probe apparatus 20A, when operating in an obfuscation mode, to contribute to one or more instances of collaborative probe information/data. Starting at block 502, the first probe apparatus 20A may request and/or receive zone information/data. For example, the first probe apparatus 20A may request zone information/data and the analysis apparatus 10 may provide the zone information/data such that the first probe apparatus 20A receives the zone information/data. For example, if the zones are predefined by, for example, the analysis apparatus 10, the first probe apparatus 20A may request zone information/data for a particular zone (e.g., using a zone identifier configured to identify the particular zone, and/or the like) that the first probe apparatus 20A is currently located in (e.g., as determined based on location information/data determined by sensors 29). In another example embodiment, the analysis apparatus 10 may push zone information/data corresponding to one or more zones such that the first probe apparatus 20A receives the zone information/data (e.g., without making an explicit request for the zone information/data). In various embodiments, the first probe apparatus 20A may comprise means, such as processor 22, memory 24, communication interface 26, and/or the like, for requesting and/or receiving zone information/data. In various embodiments, the received zone information/data comprises zone information/data corresponding to the first probe apparatus 20A (e.g., corresponding to the zone that the first probe apparatus 20A is located within).

In various embodiments, the zone information/data corresponding to a zone indicates a number of second probe apparatuses 20B located within the zone (e.g., within the time window defined by $t_1-\Delta t$ and $t_1$, where $t_1$ is the current time and/or the time at which the analysis apparatus 10 is generating and/or providing zone information/data and $\Delta t$ is a set temporal radius). For example, the zone information/data corresponding to a zone may indicate a number of second probe apparatuses 20B locate within the zone by indicating the number of second probe apparatuses 20B that have provided and/or contributed to instances of probe information/data (e.g., instances of individual probe information/data, instances of collaborative probe information/data, and/or obfuscated instances of probe information/data) in the time window defined by $t_1-\Delta t$ and $t_1$, wherein $t_1$ is the current time and/or the time at which the analysis apparatus 10 is generating and/or providing zone information/data. In various embodiments, the zone information/data may comprise one or more instances of collaborative probe information/data. For example, the analysis apparatus 10 may provide one or more instances of collaborative probe information/data from which the first probe apparatus 20A may select an instance of collaborative probe information/data to update by providing a contribution.

At block 504, it may be determined if the location information/data corresponding to the current location of the first probe apparatus 20A and/or a portion of the first probe apparatus' 20A trajectory matches an existing instance of collaborative probe information/data provided as part of the zone information/data. For example, the zone information/data may comprise one or more instances of collaborative probe information/data. In an example embodiment, the one or more instances of collaborative probe information/data correspond to the zone in which the first probe apparatus 20A is currently located. In an example embodiment, the an existing instance of collaborative probe information/data matches the location information/data for the first probe apparatus 20A and/or a portion of the trajectory of the first probe apparatus 20A when the instance of collaborative probe information/data corresponds to a position and/or at least a portion of a TME along which the first probe apparatus 20A is traveling.

For example, if an instance of collaborative probe information/data comprises a starting point (e.g., starting latitude, starting longitude) and an ending point (e.g., ending latitude, ending longitude) that are within a distance buffer of location information/data captured by sensors 29 of the first probe apparatus 20A, then the instance of collaborative probe information/data is determined to match a portion of the trajectory of the first probe apparatus 20A. For example, the distance buffer may be a distance that is up to a few yards or up to a few meters (e.g., 1 foot, half a meter, a yard, a meter, two yards, two meters, five yards, five meters). For example, the distance buffer may account for when the instance of collaborative probe information/data was generated by a second probe apparatus 20B traveling in the right lane of a two lane road segment and the first probe apparatus 20A is traveling in the left lane of the same two lane road segment, for example.

In an example embodiment, the instance of collaborative probe information/data may comprise a bitwise representation of a starting point (e.g., starting latitude, starting longitude) and an ending point (e.g., ending latitude, ending longitude) that may be incomplete (e.g., not include all of the bits of the bitwise representation). The first probe apparatus 20A may determine a bitwise representation of one or more instances of location information/data corresponding to the first probe apparatus' 20A travel through at least a portion of the road network. For example, the first probe apparatus 20A may encode one or more instances of location information/data corresponding to the first probe apparatus' 20A travel through at least a portion of the road network into a bitwise representation thereof, using, for example, an encoding function. The first probe apparatus 20A may determine if the bitwise representation(s) of the starting point and the ending point of the instance of collaborative probe information/data (e.g., at least the bits of the bitwise representation that are present in the instance of collaborative probe information/data) match the corresponding bitwise representation(s) of the one or more instances of location information/data corresponding to the first probe apparatus' 20A travel through at least a portion of the road network.

In an example embodiment, the instance of collaborative probe information/data may be determined to match a portion of the first probe apparatus' 20A trajectory through at least a portion of the road network based on location information/data alone. For example, if the starting point and ending point are within a buffer distance of instances of location information/data determined by sensor 29 of the first probe apparatus 20A, then it may be determined that the instance of collaborative probe information/data may be determined to match a portion of the first probe apparatus' 20A trajectory through at least a portion of the road network. In an example embodiment, the instance of collaborative probe information/data may be determined to match a portion of the first probe apparatus's 20A trajectory through at least a portion of the road network based on location information/data and one or more travel features of the instance of collaborative probe information/data. In an example embodiment, one or more travel features (e.g., features of the TME, portion of the trajectory, and/or the first probe apparatus' 20A travel along the TME and/or portion of the trajectory). For example, in addition to a starting point and an ending point, an instance of collaborative probe information/data may include a representative velocity (e.g., and/or at least some bits of a bitwise representation of a representative velocity). The representative velocity of is a velocity or speed that is representative of the velocity and/or velocity profile with which a probe apparatus 20 traveled the corresponding portion of the road network/TME. For example, a representative velocity of the instance of collaborative probe information/data may be the average velocity of a probe apparatus 20 that contributed to the instance of collaborative probe information/data as the probe apparatus 20 traveled from the starting point to the ending point of the instance of collaborative probe information/data. For example, it may be determined that the instance of collaborative probe information/data matches at least a portion of the first probe apparatus' 20A travel through at least a portion of the road network based on a matching of the starting point and ending point of the instance of collaborative probe information/data to location information/data determined by sensors 29 and based on a matching of one or more travel features of the instance of collaborative probe information/data to travel features determined by based on sensor information/data captured by sensors 29.

For example, a first probe apparatus 20A may determine that an instance of collaborative probe information/data matches a portion of the trajectory of the first probe apparatus 20A by determining a value change for one or more elements of the probe data (e.g., starting point, ending point, velocity, and/or the like) that occurs when the existing bits of the bitwise representation of the probe information/data of the instance of collaborative probe information/data (e.g., the bits of the bitwise representation(s) that make up the instance of collaborative probe information/data have already been contributed by contributing probe apparatuses 20) are used to replace the corresponding bits of the probe information/data determined by the first probe apparatus 20A. For example, if instance of collaborative probe information/data includes the element "xxxxxx100" and the probe information/data determined by the first probe apparatus 20A include the element "100110011", the value difference between "100110011" and "100110100" is determined. When the value difference of each of the elements of the probe information/data corresponding to the elements of the instance of collaborative probe information/data satisfy a corresponding value difference threshold requirement (e.g., is less than or equal to a value difference threshold), the instance of collaborative probe information/data is determined to match the portion of the trajectory of the first probe apparatus 20A. When the value difference of one or more of the elements of the probe information/data corresponding to the elements of the instance of collaborative probe information/data do not satisfy a corresponding value difference threshold requirement (e.g., is greater than the value difference threshold), the instance of collaborative probe information/data is determined to not match the portion of the trajectory of the first probe apparatus 20A.

When, at block 504, a matching instance of collaborative probe information/data is identified, it may be determined whether the matching instance of collaborative probe information/data is a partial or complete instance of collaborative probe information/data. For example, in an example embodiment, a partial instance of collaborative probe information/data comprises some but not all of the bits of a bitwise representation of one or more elements of the probe information/data of the instance of collaborative probe information/data and a complete instance of collaborative probe information/data comprises all of the bits of a bitwise representation of one or more elements of the probe information/data of the instance of collaborative probe information/data. When it is determined that the matching instance of collaborative probe information/data is a partial instance of collaborative probe information/data, the process continues to block 506. When it is determined that the matching instance of collaborative probe information/data is a complete instance of collaborative probe information/data, the process continues to block 508.

At block 506, a contribution is added to the matching instance of collaborative probe information/data and the updated instance of collaborative probe information/data is provided. For example, the first probe apparatus 20A contributes to the matching instance of collaborative probe information/data and then provides the updated instance of collaborative probe information/data. For example, the first probe apparatus 20A may comprise means, such as processor 22, memory 24, communication interface 26, and/or the like, for contributing to the matching instance of collaborative probe information/data and providing the updated instance of collaborative probe information/data. For example, the first probe apparatus 20A may add one or more bits of a bitwise representation of one or more elements of the probe information/data of the instance of collaborative probe information/data to generate an updated instance of collaborative probe information/data. For example, the instance of collaborative probe information/data may be built from the least significant bits of the bitwise representation of one or more elements of the probe information/data of the instance of collaborative probe information/data to the most significant bits of the bitwise representation(s). For example, the first probe apparatus 20A may add the next least significant bits of the bitwise representation of one or more elements of the probe information/data of the instance of collaborative probe information/data to the partial instance of collaborative probe information/data to generate an updated instance of collaborative probe information/data. The first probe apparatus 20A may then provide (e.g., transmit) the updated instance of collaborative probe information/data such that the analysis apparatus 10 receives the updated instance of collaborative probe information/data.

In an example embodiment, rather than add to an existing instance of collaborative probe information/data, a first probe apparatus 20A may decide to generate a new partial instance of collaborative probe information/data by forking the matching instance of collaborative probe information/data. Generating a new instance of probe information/data by forking an existing instance of collaborative probe information/data includes providing an alternative set of bits of the bitwise representation of one or more elements of the instance of collaborative probe information/data. For example, if one or more elements corresponding to a starting point of an instance of collaborative probe information/data matched the corresponding elements of the starting point of the portion of the trajectory of the first probe apparatus 20A, but the elements corresponding to the ending point or the velocity (or other travel feature) do not match, the first probe apparatus 20A may generate a new instance of collaborative probe information/data that includes the starting point from the previous instance of collaborative probe information/data (possibly with one or more next least significant bits added) and an alternative bitwise representation of the ending point and/or velocity (or other travel feature) compared to the previous instance of collaborative probe information/data.

At block 508, a confirmation of the matched instance of collaborative probe information/data may be provided. For example, the first probe apparatus 20A may provide a confirmation of the matched instance of collaborative probe information/data such that the analysis apparatus 10 receives the confirmation. For example, the first probe apparatus 20A may comprise means, such as processor 22, memory 24, communication interface 26, and/or the like, for providing a confirmation of the matched instance of collaborative probe information/data such that the analysis apparatus 10 receives the confirmation. In an example embodiment, the first probe apparatus 20A provides a confirmation by providing a communication including a collaborative instance identifier configured to identify the matched instance of collaborative probe information/data. For example, in an example embodiment, each instance of collaborative probe information/data is associated with and/or includes a collaborative instance identifier configured to uniquely identify the instance of collaborative probe information/data. In an example embodiment, the first probe apparatus 20A provides a confirmation by providing a communication including the updated instance of collaborative probe information/data.

When, at block 504, it is determined that none of the existing instances of collaborative probe information/data (e.g., none of the instances of collaborative probe information/data provided as part of the zone information/data) matches the location information/data corresponding to the current location of the first probe apparatus 20A and/or a portion of the first probe apparatus' 20A trajectory, the process continues to block 510. At block 510, a new instance of collaborative probe information/data is generated and provided. For example, the first probe apparatus 20A may generate a new instance of collaborative probe information/data and provide the new instance of collaborative probe information/data (e.g., such that the analysis apparatus 10 receives the new instance of collaborative probe information/data). For example, a new instance of collaborative probe information/data may be generated that includes the least significant bits of the bitwise representation of one or more elements of the corresponding probe information/data. For example, the first probe apparatus 20A may determine the probe information/data for instance of probe information/data (e.g., determine a starting point, ending point, and any travel features to be included in the instance of probe information/data). The first probe apparatus 20A may then encode the probe information/data into a bitwise representation using an encoding function. For example, the probe information/data may be encoded into a bitwise representation for each element of the probe information/data (e.g., starting latitude, starting longitude, ending latitude, ending longitude, each included travel feature (e.g., representative velocity)). In another example, the probe information/data may be encoded into one or more bitwise representations that correspond to two or more elements (e.g., all of the elements may be encoded into one bitwise representation, the starting latitude and starting longitude may be encoded into single starting point bitwise representation, the ending latitude and ending longitude may be encoded into a single ending point bitwise representation, and/or the like). The least significant bits of the bitwise representation(s) may then be identified and used to generate a new partial instance of collaborative probe information/data. The new instance of collaborative probe information/data may then be provided (e.g., transmitted) such that the analysis apparatus receives the new instance of collaborative probe information/data.

c. Operation of an Analysis Apparatus

In various embodiments, an analysis apparatus 10 may be configured to generate traffic and/or map information/data based on received instances of probe information/data (e.g., partial and/or complete instances of collaborative probe information/data, confirmation(s) of complete instances of collaborative probe information/data, instances of individual probe information/data, obfuscated instances of probe information/data) and provide the traffic information/data. For example, an analysis apparatus 10 may be configured to provide zone information/data, receive instances of probe information/data (e.g., partial and/or complete instances of collaborative probe information/data, confirmation(s) of complete instances of collaborative probe information/data, instances of individual probe information/data, obfuscated instances of probe information/data), generate traffic and/or map information/data based on the received instances of probe information/data, remove inactive instances of collaborative probe information/data, and/or the like. In various embodiments, the traffic and/or map information/data is provided to a consumer apparatus 30. The consumer apparatus 30 is configured to receive the traffic and/or map information/data and use the traffic and/or map information/data to perform one or more navigation functions.

FIG. 6 provides a flowchart illustrating operations, performed by an analysis apparatus 10, to generate and provide traffic and/or map information/data based on the received instances of probe information/data. Starting at block 602, a request for zone information/data may be received and/or zone information/data may be provided. For example, the analysis apparatus 10 may receive a request for zone information/data and/or the analysis apparatus 10 may provide (e.g., transmit) zone information/data. For example, the analysis apparatus 10 may comprise means, such as processor 22, memory 24, communication interface 26, and/or the like, for receiving a request for zone information/data and/or providing zone information/data. In various embodiments, the zone information/data may be provided (e.g., transmitted) such that one or more probe apparatuses 20 receive the zone information/data.

For example, a probe apparatus 20 may request zone information/data and the analysis apparatus 10 may provide the zone information/data such that the probe apparatus 20 receives the zone information/data. For example, if the zones are predefined by, for example, the analysis apparatus 10, the probe apparatus 20 may request zone information/data for a particular zone (e.g., using a zone identifier configured to identify the particular zone, and/or the like). In another example embodiment, the analysis apparatus 10 may push zone information/data corresponding to one or more zones such that the probe apparatus 20 receives the zone information/data (e.g., without the probe apparatus 20 making an explicit request for the zone information/data).

In various embodiments, the zone information/data corresponding to a zone indicates a number of probe apparatuses 20 located within the zone (e.g., within the time window defined by $t_1-\Delta t$ and $t_1$, where $t_1$ is the current time and/or the time at which the analysis apparatus 10 is generating and/or providing zone information/data). For example, the zone information/data corresponding to a zone may indicate a number of probe apparatuses 20 located within the zone by indicating the number of probe apparatuses 20 that have provided and/or contributed to instances of probe information/data (e.g., instances of individual probe information/data, instances of collaborative probe information/data, and/or obfuscated instances of probe information/data) in the time window defined by $t_1-\Delta t$ and $t_1$, wherein $t_1$ is the current time and/or the time at which the analysis apparatus 10 is generating and/or providing zone information/data. In an example embodiment, each instance of collaborative probe information/data is associated with and/or comprises a number of contributors indicating the number of probe apparatuses 20 that have contributed to and/or confirmed the instance of collaborative probe information/data.

In various embodiments, the zone information/data may comprise one or more instances of collaborative probe information/data. For example, the analysis apparatus 10 may provide one or more instances of collaborative probe information/data from which a probe apparatus 20 may select an instance of collaborative probe information/data to update by providing a contribution.

At block 604, instances of probe information/data is received. For example, the analysis apparatus 10 receives instances of probe information/data. For example, the analysis apparatus 10 comprises means, such as processor 12, memory 14, communication interface 16, and/or the like, for receiving instances of probe information/data. For example, the instances of probe information/data may comprise one or more of instances of collaborative probe information/data, instances of individual probe information/data, and/or obfuscated instances of individual probe information/data (e.g., that may be obfuscated versions of instances of individual probe information/data or instances of collaborative probe information/data where at least one contributor as contributed obfuscated probe information/data). For example, a plurality of probe apparatuses 20 may provide (e.g., transmit) instances of probe information/data such that the analysis apparatus 10 receives the instances of probe information/data.

At block 606, the received instances of probe information/data are analyzed to determine and/or generate traffic and/or map information/data. For example, the analysis apparatus 10 may analyze the received instances of probe information/data to determine and/or generate traffic and/or map information/data. For example, the analysis apparatus 10 may comprise means, such as processor 12, memory 14, and/or the like, for analyzing the received instances of probe information/data to determine and/or generate traffic and/or map information/data. For example, the instances of probe information/data may be map-matched to a corresponding TME, used to form probe trajectories, binned and/or grouped based on the corresponding map-matched TME, and analyzed (e.g., based on the binning and/or grouping) to generate and/or determine traffic and/or map information/data. In various embodiments, the traffic and/or map information/data may correspond to and/or include traffic and/or map information/data corresponding to map-matched TMEs. For example, the traffic and/or map information/data may comprise TME geometry corresponding to the TME, driving conditions along the TME, time dependent and/or time independent attributes of the TME (e.g., speed limit, a representative velocity/speed, current travel speed, free flow ratio, incident indicator/information, traffic volume, and/or the like), and/or other traffic and/or map information/data. In an example embodiment, only instances of collaborative probe information/data that satisfy a completeness threshold requirement are used to determine and/or generate traffic and/or map information/data.

At block 608, the traffic and/or map information/data is provided. For example, the analysis apparatus 10 may provide the traffic and/or map information/data such that one or more consumer apparatus 30 receives the traffic and/or map information/data. For example, the analysis apparatus 10 may comprise means, such as processor 12, memory 14, communication interface 16, and/or the like, for providing the traffic and/or map information/data such that one or more consumer apparatus 30 receives the traffic and/or map information/data. In various embodiments, the traffic and/or map information/data corresponding to a TME may be provided by itself, packaged with traffic and/or map information/data corresponding to other TMEs, and/or packaged as a layer, for example, of a digital map and/or a digital map tile (e.g., a pre-defined portion of the digital map that represents a portion of the road network that corresponds to the TME to which the traffic and/or map information/data corresponds). As indicated above, the analysis apparatus 10 may provide the traffic and/or map information/data (possibly as part of a digital map and/or digital map tile) such that one or more consumer apparatus 30 receive the traffic and/or map information/data such that at least one of the one or more consumer apparatuses may use the traffic and/or map information/data for performing one or more navigation functions.

In various embodiments, a consumer apparatus 30 receives the traffic and/or map information/data. In an example embodiment, the vehicle apparatus 30 is onboard a vehicle 5. In an example embodiment, the consumer apparatus 30 receives traffic and/or map information/data as part of a geographic database, digital map, tile of a digital map, and/or the like. In various embodiments, the consumer apparatus 30 may store the traffic and/or map information/data (e.g., as part of the geographic database, digital map, and/or one or more tiles of the digital map) in memory. The consumer apparatus 30 may then access at least a portion of the traffic and/or map information/data for use in performing one or more navigation functions. For example, a consumer apparatus 30 may comprise means, such as processor, memory, communication interface, user interface, sensors, and/or the like for receiving traffic and/or map information/data, storing traffic and/or map information/data, accessing traffic and/or map information/data, and/or using traffic and/or map information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like.

At block 610, inactive instances of collaborative probe information/data may be removed. For example, the analysis apparatus 10 may remove inactive instances of collaborative probe information/data. For example, the analysis apparatus 10 may comprise means, such as processor 12, memory 14, and/or the like, for removing inactive instances of collaborative probe information/data. In an example embodiment, removing an instance of collaborative probe information/data includes removing the instance of collaborative probe information/data from the set of instances of collaborative probe information/data that is provided to probe apparatuses 20 as part of the zone information/data. In an example embodiment, an instance of collaborative probe information/data is inactive if the instance of collaborative probe information/data has not been contributed to and/or confirmed during the time window defined by $t_1-\Delta t$ and $t_1$, where $t_1$ is the current time and $\Delta t$ is a set temporal radius. For example, if no contributions for and/or confirmations of a first instance of collaborative probe information/data have been received in the last $\Delta t$ time frame, the first instance of collaborative probe information/data may be determined to be inactive and will be removed from the set of instances of probe information/data that are provided to probe apparatuses 20 as part of zone information/data.

Technical Advantages

Various embodiments provide a technical solution to the technical problem of providing probe information/data (and/or contributing to probe information/data) while maintaining a user's privacy. For example, when a first probe apparatus is in an area or zone having only a few second probe apparatuses in the vicinity of the first probe apparatus, the first probe apparatus may operate in an obfuscation mode wherein the first probe apparatus may contribute to instances of collaborative probe information/data in an anonymous way and/or provide obfuscated instances of probe information/data. As multiple probe apparatuses contribute to an instance of collaborative probe information/data in an anonymous way, the privacy of the contributing probe apparatuses is maintained while providing an instance of probe information/data that is an approximation the traffic conditions, road geometry, and/or the like experienced by each of the contributing probe apparatuses. Additionally, by monitoring the number of contributing probe apparatuses corresponding to an instance of collaborative probe information/data, a volume of traffic corresponding to the instance of collaborative probe information/data may be determined in a manner that does not identify any of the contributing probe apparatuses. Moreover, when the first probe apparatus is in an area or zone having a large number of second probe apparatuses in the vicinity of the first probe apparatus, the first probe apparatus may provide detailed and/or accurate (e.g., without the intentional introduction of noise) probe information/data. For example, in scenarios where the privacy of a user of a first probe apparatus is less likely to be compromised (e.g., due to the large volume of nearby second probe apparatuses), the first probe apparatus may provide more detailed and/or accurate probe information/data without concern of the corresponding user's privacy being compromised. This provides for the generation of detailed and accurate traffic and/or map information/data in areas or zones having a large volume of probe apparatuses and for the generation of traffic and/or map information/data in areas or zones having a small volume of probe apparatuses present while still maintaining users' privacy. Thus, various embodiments provide technical improvements to the art of generating traffic and/or map information/data based on crowd-sourced probe information/data to address problems that arise specifically within that art.

III. Example Apparatus

The analysis apparatus 10, probe apparatus 20, and/or consumer apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the analysis apparatus 10, probe apparatus 20, and/or consumer apparatus 30 may be embodied in other types of computing devices, such as a server, a personal computer, a computer workstation, a laptop computer, a plurality of networked computing devices or the like, that are configured to update one or more map tiles, analyze probe information/data for route planning or other purposes, generate, determine, store, and/or provide traffic and/or map information/data (e.g., including driving condition information/data, in an example embodiment), and/or the like. In an example embodiment, a probe apparatus 20 and/or consumer apparatus 30 is an in-vehicle navigation system onboard a vehicle 5 or a mobile device and an analysis apparatus 10 is a server. In an example embodiment, a probe apparatus 20 is an apparatus configured to capture sensor information/data via one or more sensors onboard the corresponding vehicle 5. In an example embodiment, a consumer apparatus 30 is a probe apparatus 20. In this regard, FIG. 2A depicts an example analysis apparatus 10 and FIG. 2B depicts an example probe apparatus 20 that may be embodied by various computing devices including those identified above. As shown, the analysis apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, a consumer apparatus 30 of an example embodiment may include, may be associated with, or may otherwise be in communication with a processor and a memory device and optionally a communication interface, a user interface, one or more sensors (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the analysis apparatus 10, probe apparatus 20, and/or consumer apparatus 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the analysis apparatus 10, probe apparatus 20, and/or consumer apparatus 30 may include a user interface 18, 28 that may, in turn, be in communication with the processor 12, 22 to provide output to the user, such as one or more routes through a road network, a notification that a vehicle is approaching a human operator assistance portion of a route, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The analysis apparatus 10, probe apparatus 20, and/or consumer apparatus 30 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the analysis apparatus 10, probe apparatus 20, and/or consumer apparatus 30 of an example embodiment, a navigation system may also include or have access to a geographic database. For example, in various embodiments, an analysis apparatus 10, probe apparatus 20, and/or consumer apparatus 30 may comprise a component (e.g., memory 14, 24, and/or another component) that stores a digital map (e.g., in the form of a geographic database) comprising a first plurality of data records, each of the first plurality of data records representing a corresponding traversable map element, wherein at least some of said first plurality of data records include traffic and/or map information/data corresponding to the TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, link, or TME data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, TME data records, POI data records, and/or other data records. In an example embodiment, the analysis apparatus 10 may be configured to modify, update, and/or the like one or more data records of the geographic database. For example, the analysis apparatus 10 may modify, update, generate, and/or the like traffic and/or map information/data corresponding to TMEs, links, lanes, road segments, travel lanes of road segments, nodes, intersection, and/or the like and/or the corresponding data records (e.g., to add or update a corresponding sensor quality index table), a localization layer (e.g., comprising localization features) and/or the corresponding data records, and/or the like.

In an example embodiment, the TME data records are links, lanes, or segments (e.g., maneuvers of a maneuver graph) representing roads, travel lanes of roads, streets, or paths, as can be used in the calculated route or recorded route information for determination of one or more personalized routes. The intersection data records are end points corresponding to the respective links, segments, or TMEs of the road segment data records. The TME data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The TMEs, road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an analysis apparatus 10, probe apparatus 20, and/or consumer apparatus 30 in accordance with an example embodiment may determine the time to traverse a route that includes one or more turns at respective intersections more accurately.

IV. Apparatus, Methods, and Computer Program Products

As described above, FIGS. 3-6 illustrate flowcharts of a probe apparatus 20 and/or an analysis apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by a probe apparatus, zone information, the zone information (a) corresponding to a zone that the probe apparatus is located within and (b) comprising one or more instances of collaborative probe data corresponding to the zone, wherein the probe apparatus comprises a processor, memory, and a location sensor;
   responsive to identifying a first instance of collaborative probe data of the one or more instances of collaborative probe data that corresponds to the position of the probe apparatus or a portion of a trajectory of the probe apparatus, contributing to the first instance of collaborative probe data;

responsive to not identifying an instance of collaborative probe data of the one or more instances of collaborative probe data that corresponds to the position of the probe apparatus or the portion of the trajectory of the probe apparatus, generating a first instance of collaborative probe data that (a) corresponds to the position of the probe apparatus or the portion of the trajectory of the probe apparatus and (b) comprises an incomplete representation of probe data corresponding to the position of the probe apparatus or the portion of the trajectory of the probe apparatus;

providing the first instance of collaborative probe data such that an analysis apparatus receives the first instance of collaborative probe data, wherein the first instance of collaborative probe data comprises a portion of a bitwise representation of probe data corresponding to the position of the probe apparatus or the portion of the trajectory of the probe apparatus, and at least one of:

contributing to the first instance of collaborative probe data comprises adding one or more bits of the bitwise representation of probe data to the first instance of collaborative probe data, or generating the first instance of collaborative probe data comprises generating an instance of collaborative probe data consisting of one or more least significant bits of the bitwise representation.

2. The method of claim 1, wherein the probe data comprises a starting point of the portion of the trajectory, an ending point of the portion of the trajectory, and a representative velocity corresponding to probe apparatuses traversal of the portion of the trajectory.

3. The method of claim 1, wherein the one or more bits are next least significant bits of the bitwise representation.

4. The method of claim 1, wherein contributing to the first instance of collaborative probe data comprises determining that the first instance of collaborative probe data is complete and providing a confirmation of the first instance of collaborative probe data.

5. The method of claim 1, wherein the zone information indicates a number of second probe apparatuses in a vicinity of the probe apparatus and the method further comprises determining that the number of second probe apparatuses in the vicinity of the probe apparatus does not satisfy a volume threshold requirement and, responsive to determining that the number of second probe apparatuses in the vicinity of the probe apparatus does not satisfy a volume threshold requirement, operating in an obfuscation mode, wherein operating in an obfuscation mode comprises contributing to at least one instance of collaborative probe data.

6. The method of claim 5, further comprising periodically receiving zone information and periodically evaluating whether the volume threshold requirement is satisfied.

7. An apparatus comprising at least one processor, a communications interface, a location sensor configured to determine a position of the apparatus, and at least one memory storing computer program code, the at least one memory and the computer program code configured to, with the processor, cause the apparatus to at least:

receive volume information indicating a number of probe apparatuses in the vicinity of the apparatus;

determine whether the number of probe apparatuses in the vicinity of the apparatus satisfies a volume threshold requirement;

responsive to determining that the number of probe apparatuses in the vicinity of the apparatus satisfies the volume threshold requirement, generating and providing an instance of individual probe data such that an analysis apparatus receives the instance of individual probe data; and responsive to determining that the number of probe apparatuses in the vicinity of the apparatus does not satisfy the volume threshold requirement:

determine if a first instance of collaborative probe data of one or more instances of collaborative probe data corresponds to a position of the apparatus or a portion of a trajectory of the apparatus, wherein the one or more instances of collaborative probe data were provided by the analysis apparatus, responsive to determining that the first instance of collaborative probe data corresponds to the position of the apparatus or a portion of the trajectory of the apparatus, contribute to the first instance of collaborative probe data and providing an updated first instance of collaborative probe data such that the analysis apparatus receives the updated first instance of collaborative probe data comprises the contribution of the apparatus, and responsive to determining that none of the one or more instances of collaborative probe data corresponds to the position of the apparatus or the portion of the trajectory of the apparatus, generate a first instance of collaborative probe data that comprises a partial representation of probe data corresponding to the position of the apparatus or the portion of the trajectory of the apparatus, wherein the first instance of collaborative probe data comprises a portion of a bitwise representation of probe data corresponding to the position of the probe apparatus or the portion of the trajectory of the probe apparatus, and at least one of:

contributing to the first instance of collaborative probe data comprises adding one or more bits of the bitwise representation of probe data to the first instance of collaborative probe data, or generating the first instance of collaborative probe data comprises generating an instance of collaborative probe data consisting of one or more least significant bits of the bitwise representation.

8. The apparatus of claim 7, wherein the instance of individual probe data comprises probe data that is either (a) accurate to sensor data captured by one or more sensors in communication with the apparatus or (b) sensor data captured by the one or more sensors in communication with the apparatus that is modified based on a noise distribution.

9. The apparatus of claim 7, wherein the probe data comprises a starting point of the portion of the trajectory, an ending point of the portion of the trajectory, and one or more travel features corresponding to probe apparatuses traversal of the portion of the trajectory.

10. The apparatus of claim 7, wherein the one or more bits are next least significant bits of the bitwise representation.

11. The apparatus of claim 7, wherein contributing to the first instance of collaborative probe data comprises determining that the first instance of collaborative probe data is complete and providing a confirmation of the first instance of collaborative probe data.

12. The apparatus of claim 7, wherein at least one memory storing computer program code, the at least one memory and the computer program code are further configured to, with the processor, cause the apparatus to at least receive zone information provided by the analysis apparatus, wherein the zone information indicates a number of probe apparatuses in the vicinity of the apparatus.

13. The apparatus of claim 12, wherein at least one memory storing computer program code, the at least one memory and the computer program code are further configured to, with the processor, cause the apparatus to at least periodically receive zone information and periodically evaluate whether the volume threshold requirement is satisfied.

14. A method for generating traffic and/or map data using instances of collaborative probe data, the method comprising:
receiving an instance of collaborative probe data, the instance of collaborative probe data comprising a partial representation of probe data corresponding to travel of one or more first probe apparatuses along a portion of a road network;
providing the instance of collaborative probe data such that a second probe apparatus receives the instance of collaborative probe data;
receiving an updated version of the instance of collaborative probe data comprising a contribution from the second probe apparatus, the updated version of the instance of collaborative probe data comprising a more complete representation of the probe data then the provided instance of collaborative probe data, wherein the instance of collaborative probe data comprises a portion of a bitwise representation of probe data and the updated version of the instance of collaborative probe data comprises at least one more bit of the bitwise representation of the probe data compared to the instance of collaborative probe data; and
responsive to determining that the updated version of the instance of collaborative probe data satisfies a completeness threshold requirement, using the updated version of the instance of collaborative probe data to determine traffic and/or map data corresponding to the portion of the road network.

15. The method of claim 14, further comprising providing the traffic and/or map data such that a consumer apparatus receives the traffic and/or map data, wherein the consumer apparatus is configured to use at least a portion of the traffic and/or map data to perform a navigation function.

16. The method of claim 14, further comprising determining that a most recent updated version of the instances of collaborative probe data was received more than a set time radius ago, and, responsive thereto, removing the instance of collaborative probe data from a set of collaborative probe data to be provided to probe apparatuses.

17. The method of claim 14, further comprising receiving one or more instances of individual probe data corresponding to the portion of the road network.

18. The method of claim 17, further comprising using both the one or more instances of individual probe data and the instance of collaborative probe data to determine the traffic and/or map data.

19. The method of claim 14, wherein the instance of collaborative probe data is in instance of probe data that is completed by contributions provided by two or more probe apparatuses.

20. The method of claim 14, wherein a complete instance of collaborative probe data comprises contributions provided by two or more probe apparatuses.

* * * * *